United States Patent
Yang et al.

(10) Patent No.: US 11,300,501 B1
(45) Date of Patent: *Apr. 12, 2022

(54) METHODS FOR DETERMINING THE ACTIVITY OF AN ACTIVATED CHEMICALLY-TREATED SOLID OXIDE IN OLEFIN POLYMERIZATIONS

(71) Applicant: Chevron Phillips Chemical Company LP, The Woodlands, TX (US)

(72) Inventors: Qing Yang, Bartlesville, OK (US); Max P. McDaniel, Bartlesville, OK (US); Richard M. Buck, Bartlesville, OK (US); Tony R. Crain, Niotaze, KS (US); Ryan N. Rose, Caney, KS (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/378,846

(22) Filed: Jul. 19, 2021

Related U.S. Application Data

(63) Continuation of application No. 17/148,818, filed on Jan. 14, 2021, now Pat. No. 11,125,680.

(51) Int. Cl.
| | |
|---|---|
| *G01N 21/25* | (2006.01) |
| *C08F 110/02* | (2006.01) |
| *B01J 8/00* | (2006.01) |
| *B01J 19/24* | (2006.01) |
| *B01J 8/18* | (2006.01) |
| *C08L 23/06* | (2006.01) |
| *C08L 23/00* | (2006.01) |
| *C08L 23/08* | (2006.01) |
| *C08F 2/01* | (2006.01) |

(52) U.S. Cl.
CPC ............ *G01N 21/25* (2013.01); *B01J 8/0015* (2013.01); *B01J 8/1809* (2013.01); *B01J 19/2435* (2013.01); *C08F 2/01* (2013.01); *C08F 110/02* (2013.01); *C08L 23/06* (2013.01); *C08L 23/0815* (2013.01); *B01J 2208/00548* (2013.01); *B01J 2208/00663* (2013.01); *C08F 2400/02* (2013.01)

(58) Field of Classification Search
USPC ................... 356/402; 422/68.1, 132; 436/37; 526/59, 919; 502/439
See application file for complete search history.

(56) References Cited

U.S. PATENT DOCUMENTS

| | | |
|---|---|---|
| 3,242,099 A | 3/1966 | Manyik |
| 3,248,179 A | 4/1966 | Norwood |
| 4,501,885 A | 2/1985 | Sherk |
| 4,588,790 A | 5/1986 | Jenkins, III |
| 4,794,096 A | 12/1988 | Ewen |
| 4,808,561 A | 2/1989 | Welborn, Jr. |
| 5,352,749 A | 10/1994 | Dechellis |

(Continued)

OTHER PUBLICATIONS

IUPAC Compendium of Chemical Terminology, 2nd Ed. (1997).

*Primary Examiner* — Fred M Teskin
(74) *Attorney, Agent, or Firm* — Merchant & Gould P.C.

(57) ABSTRACT

Methods for determining the catalytic activity of an activated chemically-treated solid oxide using a color measurement technique are described, and these methods are integrated into transition metal-based catalyst preparation processes and systems, as well as into olefin polymerization processes and related polymerization reactor systems.

20 Claims, 5 Drawing Sheets

(56) References Cited

U.S. PATENT DOCUMENTS

| | | |
|---|---|---|
| 5,436,304 A | 7/1995 | Griffin |
| 5,565,175 A | 10/1996 | Hottovy |
| 5,575,979 A | 11/1996 | Hanson |
| 5,576,259 A | 11/1996 | Hasegawa |
| 5,807,938 A | 9/1998 | Kaneko |
| 5,919,983 A | 7/1999 | Rosen |
| 6,107,230 A | 8/2000 | Mcdaniel |
| 6,165,929 A | 12/2000 | McDaniel |
| 6,239,235 B1 | 5/2001 | Hottovy |
| 6,262,191 B1 | 7/2001 | Hottovy |
| 6,294,494 B1 | 9/2001 | McDaniel |
| 6,300,271 B1 | 10/2001 | McDaniel |
| 6,316,553 B1 | 11/2001 | McDaniel |
| 6,355,594 B1 | 3/2002 | McDaniel |
| 6,376,415 B1 | 4/2002 | McDaniel |
| 6,388,017 B1 | 5/2002 | McDaniel |
| 6,391,816 B1 | 5/2002 | McDaniel |
| 6,395,666 B1 | 5/2002 | McDaniel |
| 6,524,987 B1 | 2/2003 | Collins |
| 6,548,441 B1 | 4/2003 | McDaniel |
| 6,548,442 B1 | 4/2003 | McDaniel |
| 6,576,583 B1 | 6/2003 | McDaniel |
| 6,613,712 B1 | 9/2003 | McDaniel |
| 6,632,894 B1 | 10/2003 | McDaniel |
| 6,667,274 B1 | 12/2003 | Hawley |
| 6,750,302 B1 | 6/2004 | McDaniel |
| 6,833,415 B2 | 12/2004 | Kendrick |
| 7,026,494 B1 | 4/2006 | Yang |
| 7,041,617 B2 | 5/2006 | Jensen |
| 7,199,073 B2 | 4/2007 | Martin |
| 7,226,886 B2 | 6/2007 | Jayaratne |
| 7,294,599 B2 | 11/2007 | Jensen |
| 7,312,283 B2 | 12/2007 | Martin |
| 7,390,764 B2 | 6/2008 | McDaniel |
| 7,517,939 B2 | 4/2009 | Yang |
| 7,531,606 B2 | 5/2009 | Hendrickson |
| 7,598,327 B2 | 10/2009 | Shaw |
| 7,601,665 B2 | 10/2009 | McDaniel |
| 7,615,596 B2 | 11/2009 | Burns |
| 7,619,047 B2 | 11/2009 | Yang |
| 7,884,163 B2 | 2/2011 | McDaniel |
| 7,919,639 B2 | 4/2011 | Murray |
| 8,080,681 B2 | 12/2011 | Murray |
| 8,114,946 B2 | 2/2012 | Yang |
| 8,288,487 B2 | 10/2012 | Yang |
| 8,309,485 B2 | 11/2012 | Yang |
| 8,329,834 B2 | 12/2012 | Masino |
| 8,623,973 B1 | 1/2014 | McDaniel |
| 8,629,292 B2 | 1/2014 | Buck |
| 8,703,886 B1 | 4/2014 | Yang |
| 8,822,608 B1 | 9/2014 | Bhandarkar |
| 9,040,642 B2 | 5/2015 | Buck |
| 10,676,553 B2 | 6/2020 | McDaniel |
| 11,125,680 B1 * | 9/2021 | Yang ............ C08F 2/01 |
| 2005/0158864 A1 | 7/2005 | Brant |
| 2019/0025200 A1 | 1/2019 | Yang |

* cited by examiner

METHODS FOR DETERMINING THE ACTIVITY OF AN ACTIVATED CHEMICALLY-TREATED SOLID OXIDE IN OLEFIN POLYMERIZATIONS

REFERENCE TO RELATED APPLICATION

This application is a continuation application of U.S. patent application Ser. No. 17/148,818, filed on Jan. 14, 2021, now U.S. Pat. No. 11,125,680, the disclosure of which is incorporated herein by reference in its entirety.

FIELD OF THE INVENTION

The present disclosure concerns methods for determining the catalytic activity of activated chemically-treated solid oxides, and the integration of these methods into related catalyst preparation processes and systems, polymerization processes, and reactor systems.

BACKGROUND OF THE INVENTION

Catalyst systems for ethylene-based polymerizations often use an activator, such as a chemically-treated solid oxide. However, there is no discernible physical difference between chemically-treated solid oxides that are fully activated, partially activated, or unactivated. Conventionally, the procedure to assess the quality or catalytic activity of the chemically-treated solid oxide is to test its performance in a polymerization experiment in a laboratory reactor. While this is extremely beneficial to prevent the use of large amounts of inconsistent or poor quality chemically-treated solid oxide activators in commercial polymerization reactors, the turnaround time for such laboratory experiments is unacceptably long. Accordingly, it would be beneficial to determine the catalytic activity of the chemically-treated solid oxide in a much shorter timeframe. It is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Methods for determining the catalytic activity of an activated chemically-treated solid oxide are disclosed herein. In accordance with an aspect of the present invention, one such method can comprise (i) combining a sample of the activated chemically-treated solid oxide with a solution of a color indicator compound to form a treated solid support, (ii) measuring a color of the treated solid support (with any suitable color measurement instrument/device), and (iii) generating a color number (such as R+G+B) of the treated solid support, and correlating the color number to a standard to determine the catalytic activity of the activated chemically-treated solid oxide.

In another aspect, a process for preparing a catalyst composition is disclosed, and in this aspect, the process can comprise (I) determining a catalytic activity of an activated chemically-treated solid oxide, wherein the catalytic activity is determined via any of the methods disclosed herein, (II) contacting a transition metal compound, the activated chemically-treated solid oxide, and an optional co-catalyst (e.g., in a catalyst preparation vessel) to form the catalyst composition, and (III) adjusting a relative amount of at least one component of the catalyst composition based on the catalytic activity of the activated chemically-treated solid oxide (or based on the determined catalytic activity).

In yet another aspect, a process for operating a polymerization reactor system is disclosed, and in this aspect, the process can comprise (I) determining a catalytic activity of an activated chemically-treated solid oxide, wherein the catalytic activity is determined via any of the methods disclosed herein, (II) contacting a catalyst system comprising a transition metal compound, the activated chemically-treated solid oxide, and an optional co-catalyst, with an olefin monomer and an optional olefin comonomer in a reactor within the polymerization reactor system under polymerization reaction conditions to produce an olefin polymer, and (III) adjusting a flow rate of the activated chemically-treated solid oxide into the reactor when the catalytic activity of the activated chemically-treated solid oxide has reached a predetermined level (or adjusting the flow rate of the chemically-treated solid oxide based on the determined activity).

Additionally, various activation, catalyst preparation, and polymerization reactor systems are disclosed herein. One such activation system can comprise (a) an activation vessel configured to calcine a raw (or unactivated) chemically-treated solid oxide to form an activated chemically-treated solid oxide, (b) an activator storage vessel configured to receive the activated chemically-treated solid oxide from the activation vessel and further configured to introduce the activated chemically-treated solid oxide into a catalyst preparation vessel, and (c) an analytical system configured to determine a catalytic activity of the activated chemically-treated solid oxide prior to introducing the activated chemically-treated solid oxide into the catalyst preparation vessel.

A representative catalyst preparation system can comprise (a) a catalyst preparation vessel configured to contact a transition metal compound, an activated chemically-treated solid oxide, and an optional co-catalyst to form a catalyst composition, (b) an activator feed stream configured to introduce the activated chemically-treated solid oxide into the catalyst preparation vessel, (c) a transition metal compound feed stream configured to introduce the transition metal compound into the catalyst preparation vessel, (d) a catalyst system feed stream configured to withdraw the catalyst composition from the catalyst preparation vessel (e.g., and to introduce the catalyst composition into a reactor, if desired), and (e) an analytical system (e.g., comprising a color analyzer) configured to determine a catalytic activity of the activated chemically-treated solid oxide prior to introducing the activated chemically-treated solid oxide into the catalyst preparation vessel.

A representative polymerization reactor system can comprise (A) a reactor configured to contact a catalyst system with an olefin monomer and an optional olefin comonomer under polymerization reaction conditions to produce an olefin polymer, (B) a catalyst preparation vessel configured to contact a transition metal compound, an activated chemically-treated solid oxide, and an optional co-catalyst to form the catalyst system, and (C) an analytical system (e.g., comprising a color analyzer) configured to determine a catalytic activity of the activated chemically-treated solid oxide prior to introducing the activated chemically-treated solid oxide into the catalyst preparation vessel.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

BRIEF DESCRIPTION OF THE FIGURES

The following figures form part of the present specification and are included to further demonstrate certain aspects of the present invention. The invention may be better understood by reference to one or more of these figures in combination with the detailed description presented herein.

DEFINITIONS

Figure 1:
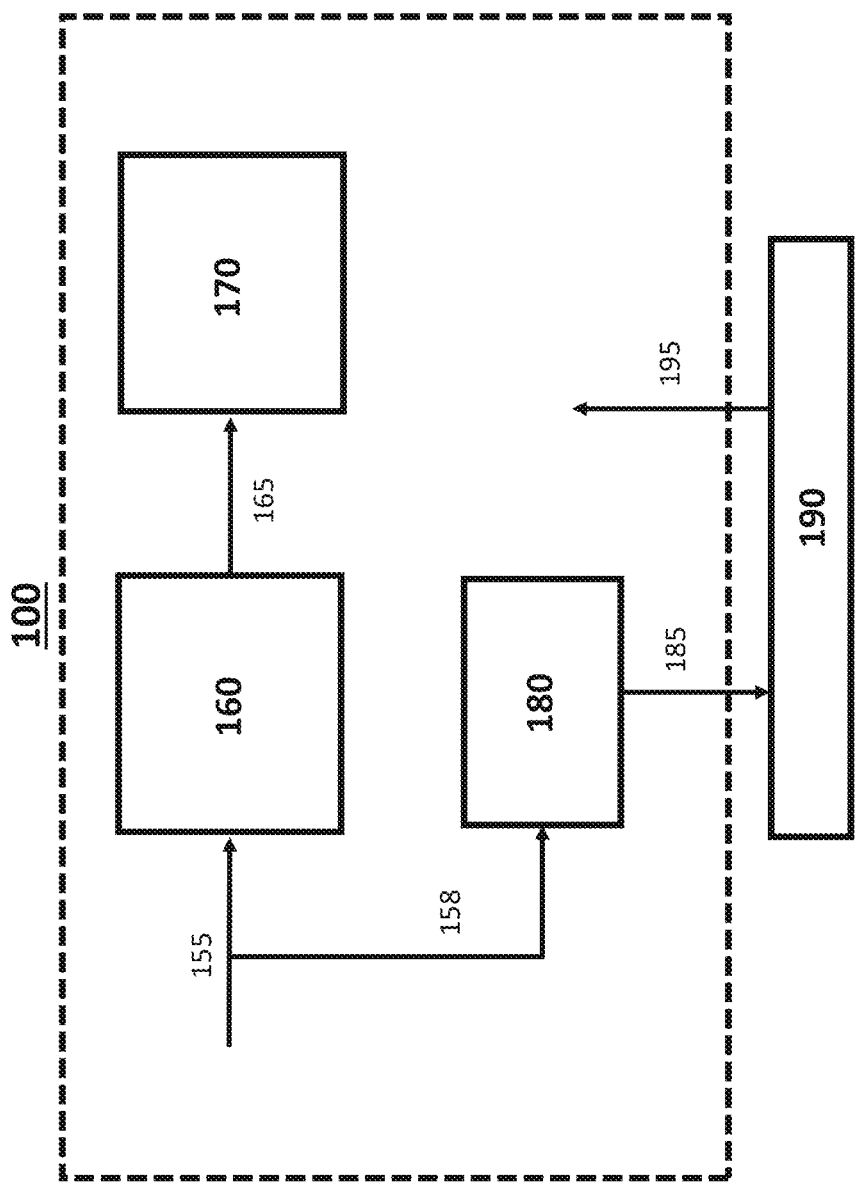
FIG. 1 illustrates a schematic block diagram of a polymerization reactor system consistent with aspects of this invention.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the systems, compositions, processes, and/or methods described herein are contemplated with or without explicit description of the particular combination. Additionally, unless explicitly recited otherwise, any aspect and/or feature disclosed herein can be combined to describe inventive features consistent with the present disclosure.

In this disclosure, while systems, processes, and methods are often described in terms of "comprising" various components, devices, or steps, the systems, processes, and methods can also "consist essentially of" or "consist of" the various components, devices, or steps, unless stated otherwise.

The terms "a," "an," and "the" are intended to include plural alternatives, e.g., at least one. For instance, the disclosure of "a polymerization reactor" or "a transition metal compound" is meant to encompass one, or combinations of more than one, polymerization reactor or transition metal compound, unless otherwise specified.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

The term "about" means that amounts, sizes, formulations, parameters, and other quantities and characteristics are not and need not be exact, but may be approximate and/or larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" may mean within 10% of the reported numerical value, preferably within 5% of the reported numerical value.

Various numerical ranges are disclosed herein. When a range of any type is disclosed or claimed, the intent is to disclose or claim individually each possible number that such a range could reasonably encompass, including end points of the range as well as any sub-ranges and combinations of sub-ranges encompassed therein, unless otherwise specified. As a representative example, the present disclosure recites that the polymerization reaction conditions can comprise a polymerization reaction temperature in a range from about 60° C. to about 115° C. in certain aspects. By a disclosure that the temperature can be in a range from about 60° C. to about 115° C., the intent is to recite that the temperature can be any temperature within the range and, for example, can be equal to about 60° C., about 65° C., about 70° C., about 75° C., about 80° C., about 85° C., about 90° C., about 95° C., about 100° C., about 105° C., about 110° C., or about 115° C. Additionally, the temperature can be within any range from about 60° C. to about 115° C. (for example, the temperature can be in a range from about 70° C. to about 110° C.), and this also includes any combination of ranges between about 60° C. and about 115° C. Further, in all instances, where "about" a particular value is disclosed, then that value itself is disclosed. Thus, the disclosure of a temperature range from about 60° C. to about 115° C. also discloses a temperature range from 60° C. to 115° C. (for example, the temperature can be in a range from 70° C. to 110° C.), and this also includes any combination of ranges between 60° C. and 115° C. Likewise, all other ranges disclosed herein should be interpreted in a manner similar to this example.

The term "polymer" is used herein generically to include olefin homopolymers, copolymers, terpolymers, and the like, as well as alloys and blends thereof. The term "polymer" also includes impact, block, graft, random, and alternating copolymers. A copolymer can be derived from an olefin monomer and one olefin comonomer, while a terpolymer can be derived from an olefin monomer and two olefin comonomers. Accordingly, "polymer" encompasses copolymers and terpolymers. Similarly, the scope of the term "polymerization" includes homopolymerization, copolymerization, and terpolymerization. Therefore, an ethylene polymer would include ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an ethylene copolymer can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer. The term "polymer" also includes all possible geometrical configurations, if present and unless stated otherwise, and such configurations can include isotactic, syndiotactic, and random symmetries. The term "polymer" also is meant to include all molecular weight polymers, and is inclusive of lower molecular weight polymers or oligomers.

The term "contacting" is used herein to describe systems, compositions, processes, and methods in which the components are contacted or combined together in any order, in any manner, and for any length of time, unless otherwise specified. For example, the components can be combined by blending or mixing, using any suitable technique.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

DETAILED DESCRIPTION OF THE INVENTION

When operators of commercial polymerization reactors are unsure about the quality and activity or productivity of the chemically-treated solid oxide activator, samples typically are shipped to a catalyst laboratory, then the samples are tested in a laboratory or bench-scale reactor. This process often can take 3-5 days, and thus is time consuming and impractical for real-time control, monitoring, and troubleshooting in commercial polymerization plants.

Therefore, a key objective of this invention is a non-polymerization method to assess the catalytic activity of the chemically-treated solid oxide. Herein, catalytic activity data can be turned around rapidly (e.g., in an hour or less), and the testing protocol is inexpensive and can be implemented on-site at the manufacturing plant.

Methods for Determining Catalytic Activity

Aspects of this invention are directed to methods for determining a catalytic activity of an activated chemically-treated solid oxide. Such methods can comprise (or consist essentially of, or consist of) (i) combining a sample of the activated chemically-treated solid oxide with a solution of a color indicator compound to form a treated solid support, (ii) measuring a color of the treated solid support, and (iii) generating a color number of the treated solid support, and correlating the color number to a standard to determine the catalytic activity of the activated chemically-treated solid oxide. Generally, the features of the methods disclosed herein (e.g., the chemically-treated solid oxide, the color indicator compound, the solution, the color number, and the standard, among others) are independently described herein, and these features can be combined in any combination to further describe the disclosed methods. Moreover, other process steps can be conducted before, during, and/or after any of the steps listed in the disclosed methods, unless stated otherwise.

In step (i), a sample of the activated chemically-treated solid oxide is combined with a solution of a color indicator compound to form a treated solid support. Generally, the solution comprises the color indicator compound and a hydrocarbon solvent. Typical hydrocarbon solvents can include, but are not limited to, propane, cyclohexane, isobutane, n-butane, n-pentane, isopentane, neopentane, n-hexane, toluene, and the like, as well as combinations thereof. In an aspect, the hydrocarbon solvent can comprise pentane, hexane, heptane, benzene, toluene, or xylene, and the like, as well as mixtures or combinations thereof.

Any suitable color indicator compound can be used herein. Generally, suitable color indicator compounds include compounds that change the color of an activated chemically-treated solid oxide after being contacted with the activated chemically-treated solid oxide, but do not change the color of an unactivated chemically-treated solid oxide after being contacted with the unactivated chemically-treated solid oxide. In an aspect, the color indicator compound can be an electron-rich compound, while in another aspect, the color indicator compound can be an unsaturated compound, and in yet another aspect, the color indicator compound can be both electron-rich and unsaturated. Preferably, but not required, it is advantageous if the color indicator compound is colorless (and therefore, the color indicator solution containing the solvent and the color indicator compound is colorless).

Illustrative and non-limiting examples of suitable color indicator compounds encompassed herein can include the following nitrogen-containing compounds:

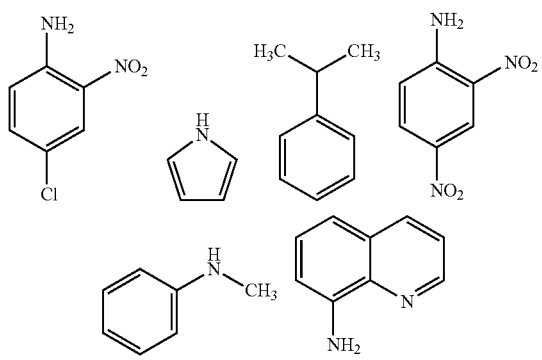

and the like, as well as combinations thereof.

Other illustrative and non-limiting examples of suitable color indicator compounds encompassed herein can include the following compounds without a nitrogen atom:

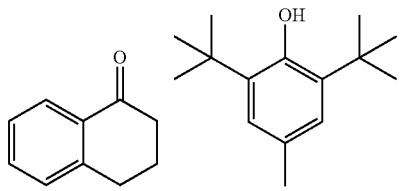

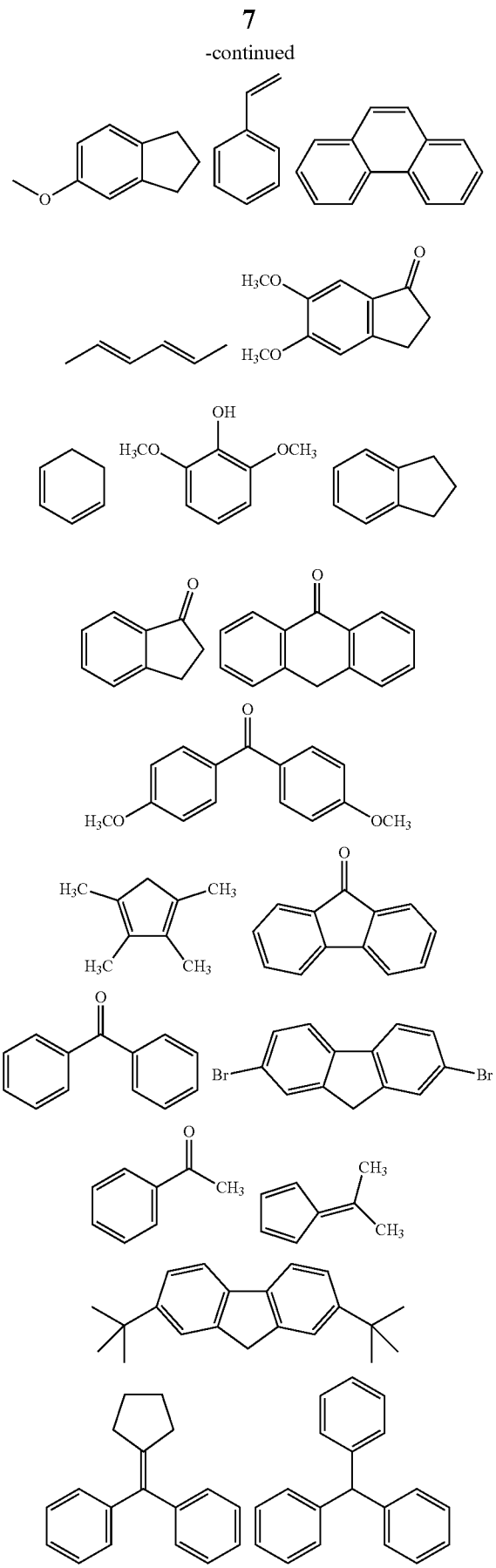
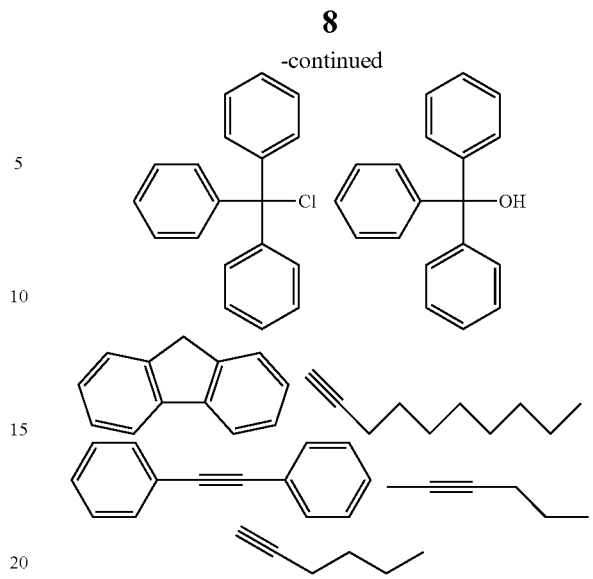

and the like, as well as combinations thereof.

In step (i), the sample of the activated chemically-treated solid oxide is combined with the solution of a color indicator compound in any suitable vessel or container, illustrative examples of which can include a flask, a jar, a test tube, or a flow cell apparatus. Other suitable sample chambers can be used in step (i). A representative flow cell apparatus contemplated herein (for combining the sample of the activated chemically-treated solid oxide with the solution of the color indicator compound to form the treated solid support) can be configured to segregate the solid (treated solid support) to a bottom portion of the flow cell apparatus and for any liquids to occupy an upper portion of the flow cell apparatus (settling of the solids due to their higher density), and the bottom portion of the flow cell apparatus can be configured for easy measuring of the color of the treated solid support (with a suitable color measurement instrument/device).

The time and temperature conditions in step (i) are not particularly limited, although ambient/room temperature is typically used for convenience. The contact time in step (i)—prior to measuring the color in step (ii)—is a time period sufficient for the color indicator compound and the activated chemically-treated solid oxide to interact/react, and for convenience often is in the 1 min to 4 hr range, although not limited thereto.

The color of the treated solid support is measured in step (ii), and such can be accomplished with any suitable color measurement instrument or device. Non-limiting examples include a smartphone, a spectrophotometer, a colorimeter, and the like. If desired, the colored treated solid support (i.e., solids) can be separated from any liquids that are present prior to color measurement, and this can be accomplished using a variety of techniques, such as sieving, filtering, centrifuging, and the like, and including combinations or two or more of these techniques, as well as any other suitable technique for removing solids or particulates from a liquid fraction.

In step (iii), a color number of the treated solid support is generated, then the color number is correlated to a standard to determine the catalytic activity of the activated chemically-treated solid oxide. Any numerical representation of the color of the treated solid support can be used as the color number; for example, the color number can be a summation of R+G+B (Red+Green+Blue). The R+G+B color model is an additive color model in which red, green, and blue light are added together in various ways to reproduce a broad array of colors. The name of the model comes from the initials of the three additive primary colors (red, green, and blue). The main purpose of the RGB color model is for the sensing, representation, and display of images in electronic systems, such as televisions and computers, though it has also been used in conventional photography. In effect, if a picture is inputted into a photoshop program (such as Adobe), the program will output the red, green, and blue information for any spot on the picture. Color picker is another common program that can be used to derive red, green, and blue data from a picture or photograph.

The color number of the treated solid oxide is correlated to a standard, and the standard can comprise a calibration curve. The step of correlating can be performed manually or can be performed automatically. If calibration curves are used, these calibration curves can be generated by any procedure known to one of skill in the art, non-limiting illustrations of which are shown in the examples that follow. Thus, the step of correlating the color number to a standard can comprise any suitable method that converts the color number into the catalytic activity of the activated chemically-treated solid oxide.

The step of correlating can comprise any suitable method or technique that converts the color number into the catalytic activity of the activated chemically-treated solid oxide. The correlation step can be performance manually, or can be configured to automatically convert color number data— e.g., via a mathematical model—into the catalytic activity of the activated chemically-treated solid oxide.

In some instances, actual color numbers can be generated, which can be collected or outputted, viewed on a monitor or computer screen, or printed in hard copy form. In other instances, the color numbers are generated, but not collected or outputted into a viewable form. For example, data from the color measurement can be directly converted (or automatically converted) into the catalytic activity of the activated chemically-treated solid oxide by correlating to a standard, such as a calibration curve or mathematical model.

Polymerization Reactor Systems

Various polymerization reactor systems and processes for operating or controlling such systems are disclosed and described herein. For instance, in one aspect, a process for operating a polymerization reactor system can comprise (I) determining a catalytic activity of an activated chemically-treated solid oxide, wherein the catalytic activity is determined via any method described herein, (II) contacting a catalyst system comprising a transition metal compound, the activated chemically-treated solid oxide, and an optional co-catalyst, with an olefin monomer and an optional olefin comonomer in a reactor within the polymerization reactor system under polymerization reaction conditions to produce an olefin polymer, and (III) adjusting a flow rate of the activated chemically-treated solid oxide into the reactor when the catalytic activity of the activated chemically-treated solid oxide has reached a predetermined level. Hence, the flow rate (or feed rate) of the chemically-treated solid oxide can be adjusted, manually and/or automatically, based on the determined activity. Generally, the features of the processes for operating polymerization reactor systems disclosed herein (e.g., the chemically-treated solid oxide, the transition metal compound, the catalyst system, the olefin monomer, the olefin comonomer, the reactor, the method of determining the catalytic activity, and the flow rate control of the chemically-treated solid oxide, among others) are independently described herein, and can be combined in any combination to further describe the disclosed processes. Moreover, other steps can be conducted before, during, and/or after any of the steps listed in the disclosed processes, unless stated otherwise.

Step (I) is directed to determining a catalytic activity of the activated chemically-treated solid oxide using a color measurement technique. Accordingly, the specific features relating to step (I) can be the same as those disclosed and described herein as it pertains to methods for determining the catalytic activity of an activated chemically-treated solid oxide.

In step (II), a catalyst system comprising a transition metal compound, the activated chemically-treated solid oxide, and an optional co-catalyst, is contacted with an olefin monomer and an optional olefin comonomer in a reactor within the polymerization reactor system under polymerization reaction conditions to produce an olefin polymer. In one aspect, the catalyst system does not contain co-catalyst, while in another aspect, and more often, the catalyst system contains a co-catalyst. Likewise, in some aspects, only one transition metal compound is present in the catalyst system, whereas in other aspects, two or more transition metal compounds are present in the catalyst system.

The processes disclosed herein are applicable to a wide variety of circumstances where the catalytic activity of the activated chemically-treated solid oxide may be of interest. For instance, when the catalytic activity of the activated chemically-treated solid oxide has reached a predetermined level, the flow rate of the activated chemically-treated solid oxide into the reactor can be adjusted. The predetermined level can be readily ascertained by one of skill in the art depending upon, for instance, the historic and the prevailing conditions in the polymerization reactor system. As a non-limiting example, a predetermined level can be a decrease of a certain percentage of the catalytic activity of the activated chemically-treated solid oxide (e.g., beyond that which is deemed allowable during normal on-prime production). For instance, the target catalytic activity of the activated chemically-treated solid oxide can be 95% of maximum activity (which translates to 95% of maximum polymer productivity on a g/g basis based on the activated chemically-treated solid oxide), and the predetermined lower and upper control limits can be 90% and 100%, respectively, for normal on-prime production. If the measured activity of the activated chemically-treated solid oxide was 75%, then the feed rate of the activated chemically-treated solid oxide to the catalyst preparation vessel (and in turn, to the polymerization reactor) can be increased to increase the amount of "active" chemically-treated solid oxide in the polymerization reactor, such that the overall productivity in the reactor is increased due to the increased addition amount of chemically-treated solid oxide.

The flow rate in step (III) is controlled by adjusting a flow rate of the activated chemically-treated solid oxide to a catalyst preparation vessel in one aspect, by adjusting a relative flow rate (ratio of activated chemically-treated solid oxide:transition metal compound) to a catalyst preparation vessel in another aspect, by adjusting a flow rate of the catalyst system exiting the catalyst preparation vessel and entering the reactor in yet another aspect, or by any combination of these techniques in still another aspect.

As an example, if the catalytic activity of the activated chemically-treated solid oxide is below a target activity, the flow rate of the activated chemically-treated solid oxide into the reactor can be increased by increasing a relative flow rate (ratio of activated chemically-treated solid oxide:transition metal compound) to the catalyst preparation vessel. This can be accomplished, for instance, by increasing the feed rate of the activated chemically-treated solid oxide to the catalyst preparation vessel, while keeping constant the feed rate of the transition metal compound to the catalyst preparation vessel.

Optionally, the disclosed processes for operating a polymerization reactor system can further comprise—based on the catalytic activity of the activated chemically-treated solid oxide—controlling a flow rate of the transition metal compound into the reactor; additionally or alternatively, controlling a flow rate of the co-catalyst into the reactor; additionally or alternatively, controlling an ethylene concentration in the reactor; or additionally or alternatively, controlling a polymerization temperature in the reactor. As a non-limiting illustration, if the catalytic activity of the activated chemically-treated solid oxide is below a particular target value, then the ethylene concentration in the reactor can be increased to compensate for the lower activity of the activated chemically-treated solid oxide. Likewise, the polymerization temperature can be increased to compensate for the lower activity of the activated chemically-treated solid oxide.

In another aspect of this invention, a polymerization reactor system is provided, and in this aspect, the polymerization reactor system can comprise (A) a reactor configured to contact a catalyst system with an olefin monomer and an optional olefin comonomer under polymerization reaction conditions to produce an olefin polymer, (B) a catalyst preparation vessel configured to contact a transition metal compound, an activated chemically-treated solid oxide, and an optional co-catalyst to form the catalyst system, and (C) an analytical system configured to determine a catalytic activity of the activated chemically-treated solid oxide prior to introducing the activated chemically-treated solid oxide into the catalyst preparation vessel. Generally, the features of any of the polymerization reactor systems disclosed herein (e.g., the polymerization reactor, the catalyst system, the olefin monomer (and olefin comonomer, if any), the polymerization conditions, the olefin polymer, the catalyst preparation vessel, and the analytical system, among others) are independently described herein, and these features can be combined in any combination to further describe the disclosed polymerization reactor systems. Moreover, other devices or reactor system components in addition to the reactor, the catalyst preparation vessel, and the analytical system, can be present in the disclosed polymerization reactor systems, unless stated otherwise. Additionally, the catalyst system can be contacted with an olefin monomer and an olefin comonomer (e.g., contacted with ethylene and an α-olefin comonomer, such as 1-hexene) in the polymerization reactor in certain aspects contemplated herein.

Referring first to the analytical system, which can include any analytical system or device that is configured to determine the catalytic activity of the activated chemically-treated solid oxide prior to introducing the activated chemically-treated solid oxide into the catalyst preparation vessel. For instance, the analytical system can include a suitable color measurement instrument or color analyzer, for instance, a smartphone, a spectrophotometer, a colorimeter, and the like. In one aspect of this invention, the analytical system can comprise a color analyzer for measuring a color of the activated chemically-treated solid oxide after contacting the activated chemically-treated solid oxide with a color indicator solution, and a computer system for generating a color number (e.g., R+G+B) of the treated solid support and for correlating the color number to a standard to determine the catalytic activity of the activated chemically-treated solid oxide. The computer system can be "built-in" or integrated with the color analyzer, or the computer system can be external, such that the external computer system takes the output from the color analyzer and determines the catalytic activity. As described herein, the standard can comprise a calibration curve, and the step of correlating can comprise any suitable technique for converting the color number into the catalytic activity of the activated chemically-treated solid oxide, such as a mathematical model.

The catalyst preparation vessel can include any vessel or apparatus that is capable of contacting (e.g., mixing or blending) two or more components of a catalyst system to form the catalyst system. The catalyst preparation vessel can be a mixing tank or other suitable stirred tank or vessel. The catalyst system can be delivered from the catalyst preparation vessel to the reactor, as needed. Often, in the catalyst preparation vessel, the transition metal compound (e.g., one, two, or three) and the activated chemically-treated solid oxide are contacted, or alternatively, the transition metal compound (e.g., one, two, or three), an activated chemically-treated solid oxide, and a co-catalyst are contacted, to form the catalyst system. Multi-component catalyst preparation vessels and methods are disclosed in, for instance, U.S. Pat. No. 7,615,596 (e.g., a pre-contactor), which is incorporated herein by reference in its entirety.

Optionally, the polymerization reactor system can further comprise a controller that is configured to control a flow rate of the activated chemically-treated solid oxide into the reactor based on, or according to, the catalytic activity determined by the analytical system. Thus, the polymerization reactor system can comprise a reactor, a catalyst preparation vessel, an analytical system, and a controller. The controller, which can comprise any suitable processing unit or computer system, can be used to analyze the data regarding the catalytic activity of the activated chemically-treated solid oxide, and adjust the flow rate of the activated chemically-treated solid oxide into the reactor system based on the determined activity. In another aspect, the controller can be programmed with an algorithm to control the flow rate of the activated chemically-treated solid oxide into the reactor system based on a catalytic activity determined by the analytical system. As an example, if the catalytic activity determined by the analytical system is too low, the flow rate can be increased by the controller.

The controller can be operated on an as-needed basis, at set time intervals, or continuously, depending upon the requirements of the reactor system. Thus, it is contemplated that the catalytic activity of the activated chemically-treated solid oxide can be monitored and/or adjusted and/or controlled continuously. Accordingly, in particular aspects consistent with this invention, the polymerization reactor system and the controller can operate in real-time or near real-time, such that the catalytic activity of the activated chemically-treated solid oxide can be determined, and that determined activity can be used, instantaneously or nearly instantaneously, to adjust the flow rate or feed rate of the activated chemically-treated solid oxide.

The controller or computing device can be implemented using a personal computer, a network computer, a server, a mainframe, or other similar microcomputer-based workstation. The controller or computing device can comprise any computer operating environment, such as hand-held devices, multiprocessor systems, microprocessor-based or programmable sender electronic devices, minicomputers, mainframe computers, and the like. The controller or computing device also can be practiced in distributed computing environments where tasks are performed by remote processing devices.

Furthermore, the controller or computing device can comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples, and the controller or computing device can comprise other systems or devices. Controller or computing device also can be implemented via a system-on-a-chip (SOC) where each and/or many of the components illustrated above can be integrated onto a single integrated circuit. Such an SOC device can include one or more processing units, graphics units, communications units, system virtualization units and various application functionalities, all of which can be integrated (or "burned") onto the chip substrate as a single integrated circuit. Other controller methodologies and devices are readily apparent to one of skill in the art in view of this disclosure.

Controllers of the systems disclosed herein can control the flow rate of the activated chemically-treated solid oxide into, or within, the polymerization reactor system by any method that affords precise and near instantaneous control based on the catalytic activity of the activated chemically-treated solid oxide.

The systems disclosed herein are applicable to a wide variety of circumstances where the catalytic activity of the activated chemically-treated solid oxide may be of interest. For instance, the controller can be further configured to control—based on, or according to, the catalytic activity determined by the analytical system—a flow rate of the transition metal compound into the reactor, and/or a flow rate of the co-catalyst into the reactor, and/or an ethylene concentration in the reactor, and/or a polymerization temperature in the reactor.

Figure 2:
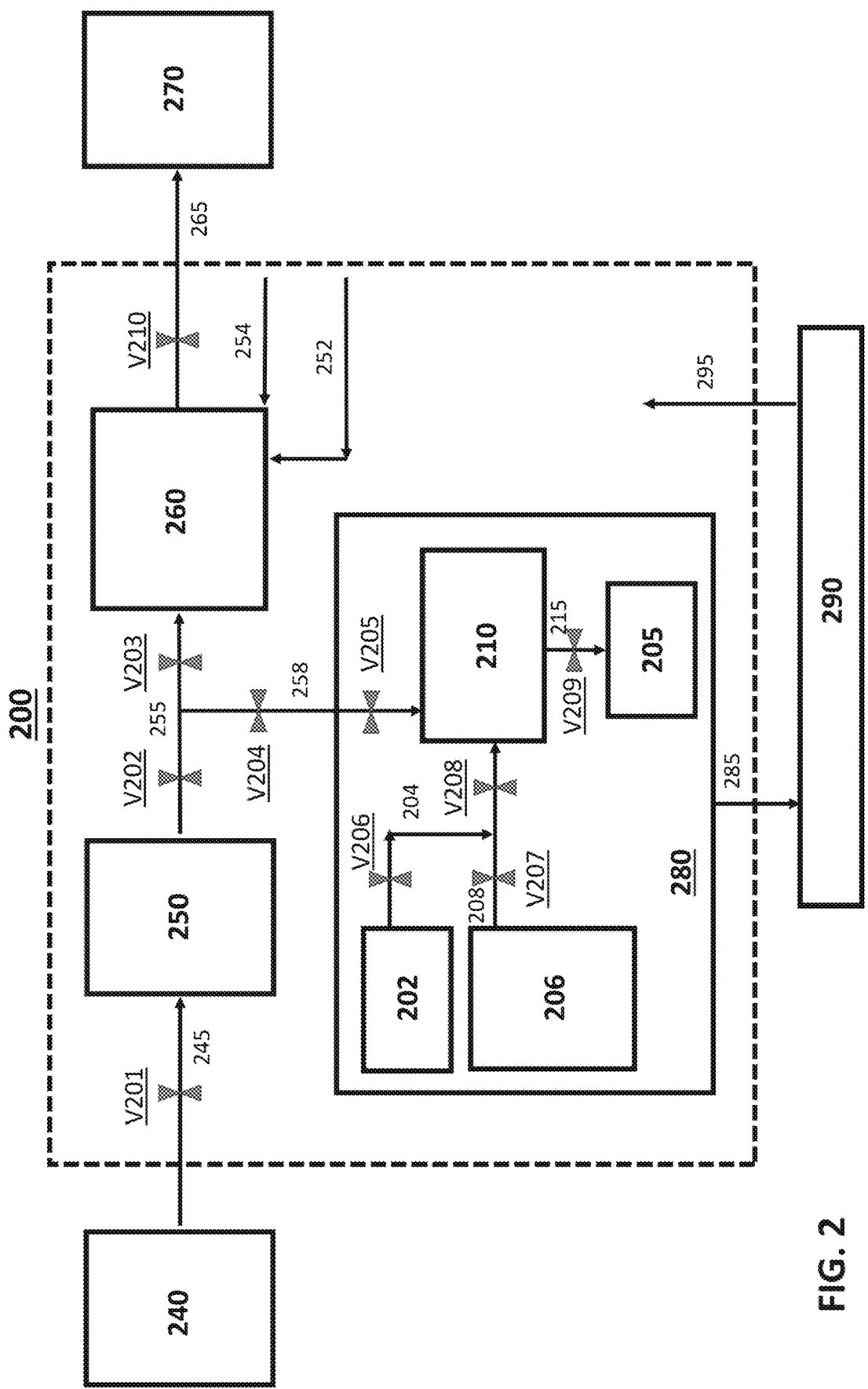
FIG. 2 illustrates a schematic block diagram of a catalyst preparation system consistent with aspects of this invention.

A representative polymerization reactor system 100 consistent with aspects of this invention is illustrated in FIG. 1. The polymerization reactor system 100 includes a catalyst preparation vessel 160, a reactor 170, an analytical system 180, and a controller 190. The analytical system 180 can include a color analyzer and a computer system as described herein. The polymerization reactor system 100 of FIG. 1 includes an activator feed stream 155 for introducing the activated chemically-treated solid oxide into the catalyst preparation vessel 160 (separate feed streams to the catalyst preparation vessel for other catalyst components are not shown in FIG. 1, but are illustrated in FIG. 2). As shown in FIG. 1, a sample stream 158 from the activator feed stream 155 is submitted to the analytical system 180 for determination of the catalytic activity of the activated chemically-treated solid oxide prior to its entry into the catalyst preparation vessel 160. The polymerization reactor system 100 includes a catalyst system feed stream 165 from the catalyst preparation vessel 160 to the reactor 170. Other feed streams to the reactor, such as monomer/comonomer (e.g., ethylene and α-olefin comonomers), hydrogen, diluent, and the like, are not illustrated in FIG. 1, but their presence would be recognized by those of skill in the art.

Information or data 185 on the catalytic activity of the activated chemically-treated solid oxide from the analytical system 180 can be provided to controller 190, which can then control or adjust 195 a flow rate of the activated chemically-treated solid oxide into the reactor (e.g., into the catalyst preparation vessel), a flow rate of the transition metal compound and/or the co-catalyst into the reactor (e.g., into the catalyst preparation vessel), an ethylene concentration in the reactor, and/or a polymerization temperature in the reactor. For example, if the activity determined by the analytical system 180 is too low or below a target value, the controller 190 can increase the feed rate of the activated chemically-treated solid oxide 155 to the catalyst preparation vessel 160 (and thus, to the reactor 170). As another example, if the catalytic activity is too low or below a target value, the controller 190 can increase the ethylene concentration in the reactor.

The disclosed polymerization reactor systems and methods of operating same are intended to encompass any olefin polymerization process using any/all types of polymerization reactors and polymerization reaction conditions. As used herein, "polymerization reactor" includes any polymerization reactor capable of polymerizing (inclusive of oligomerizing) olefin monomers and comonomers (one or more than one comonomer, if used) to produce homopolymers, copolymers, terpolymers, and the like. The various types of polymerization reactors include those that can be referred to as a slurry reactor, gas-phase reactor, solution reactor, high pressure reactor, tubular reactor, autoclave reactor, and the like, including combinations thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. These reactor types generally can be operated continuously. Continuous processes can use intermittent or continuous polymer product discharge. Polymerization reactor systems and processes also can include partial or full direct recycle of unreacted monomer, unreacted comonomer, and/or diluent.

Polymerization reactor systems disclosed herein can comprise one type of polymerization reactor or multiple reactors of the same or different type. For instance, the polymerization reactor system can comprise a solution reactor, a gas-phase reactor, a slurry reactor, or a combination of two or more of these reactors. Production of polymers in multiple reactors can include several stages in at least two separate polymerization reactors interconnected by a transfer device making it possible to transfer the polymer resulting from the first polymerization reactor into the second reactor. The polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both.

According to one aspect, the polymerization reactor system can comprise at least one loop slurry reactor, e.g., comprising vertical or horizontal loops. Monomer, diluent, catalyst, and optional comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used, such as can be employed in the bulk polymerization of propylene to form polypropylene homopolymers.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, 5,436,304, 7,531,606, and 7,598,327, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately in such high pressure polymerization reactors to obtain optimal polymerization reaction conditions.

According to yet another aspect, the polymerization reactor system can comprise a solution polymerization reactor, wherein the monomer/comonomer can be contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures (e.g., up to between 150° C. and 180° C.) and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

In some aspects, the polymerization reactor system can comprise any combination of a raw material feed system, a feed system for catalyst and/or catalyst components, and/or a polymer recovery system, including continuous systems. In other aspects, suitable reactor systems can comprise systems for feedstock purification, catalyst storage and preparation, extrusion, reactor cooling, polymer recovery, fractionation, recycle, storage, loadout, laboratory analysis, and process control.

Polymerization conditions that can be monitored, adjusted, and/or controlled for efficiency and to provide desired polymer properties can include, but are not limited to, reactor temperature, reactor pressure, catalyst system flow rate into the reactor, monomer flow rate (and comonomer, if employed) into the reactor, monomer concentration in the reactor, olefin polymer output rate, recycle rate, hydrogen flow rate (if employed), reactor cooling status, and the like. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, from about 60° C. to about 185° C., from about 60° C. to about 115° C., or from about 130° C. to about 180° C., depending upon the type of polymerization reactor, polymer grade, and so forth. In some reactor systems, the polymerization reactor temperature generally can be within a range from about 70° C. to about 110° C., or from about 125° C. to about 175° C.

Suitable pressures will also vary according to the reactor and polymerization type. The pressure for liquid phase polymerizations in a loop reactor typically can be less than 1000 psig (6.9 MPa). The pressure for gas phase polymerization usually can be in the 200 psig to 500 psig range (1.4 MPa to 3.4 MPa). High pressure polymerization in tubular or autoclave reactors generally can be conducted at about 20,000 psig to 75,000 psig (138 MPa to 517 MPa). Polymerization reactors can also be operated in a supercritical region occurring at generally higher temperatures and pressures (for instance, above 92° C. and 700 psig (4.83 MPa)). Operation above the critical point of a pressure/temperature diagram (supercritical phase) can offer advantages to the polymerization reaction process.

The concentration of the reactants entering the polymerization reactor can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, stereoregularity, crack growth, long chain branching, and rheological measurements.

Aspects contemplated herein also are directed to, and encompass, the polymers (or oligomers) produced by any of the polymerization reactor systems and methods disclosed herein. Articles of manufacture can be formed from, and/or can comprise, the polymers (or oligomers) produced in accordance with the systems and methods described herein.

Catalyst Systems

The methods, processes, and systems disclosed herein are applicable to any catalyst system suitable for the polymerization of an olefin monomer, but are not limited thereto. Herein, a "catalyst system" also can be referred to as a "catalyst composition," and these terms are used interchangeably. In the catalyst system (or the catalyst composition), the transition metal compound can comprise (or each transition metal compound independently can comprise, if two or more transition metal compound are present in the catalyst system) a transition metal (one or more than one) from Groups 3-12 of the Periodic Table of the Elements (*Chemical and Engineering News*, 63(5), 27, 1985). In one aspect, the transition metal compound can comprise (or each transition metal compound independently can comprise) a Group 3, 4, 5, or 6 transition metal, or a combination of two or more transition metals. The transition metal compound can comprise (or each transition metal compound independently can comprise) chromium, vanadium, titanium, zirconium, hafnium, or a combination thereof, in some aspects, or can comprise chromium, titanium, zirconium, hafnium, or a combination thereof, in other aspects. Accordingly, the transition metal compound can comprise (or each transition metal compound independently can comprise) chromium, or titanium, or zirconium, or hafnium, either singly or in combination.

In certain aspects of this invention, the transition metal compound can comprise (or each transition metal compound independently can comprise) any suitable non-metallocene compound. Generally, the methods, processes, and systems disclosed herein are most applicable to transition metal compounds, such as non-metallocene compounds, where such transition metal compound(s) is/are suitable for use in olefin polymerization processes, for instance, ethylene-based polymerization processes.

Illustrative and non-limiting examples of suitable transition metal compounds encompassed herein can include the following compounds (R and R'=halide or $C_1$-$C_{18}$ hydrocarbyl group, n=an integer from 0 to 4, Ph=phenyl, tBu=tert-butyl, py=pyridine):

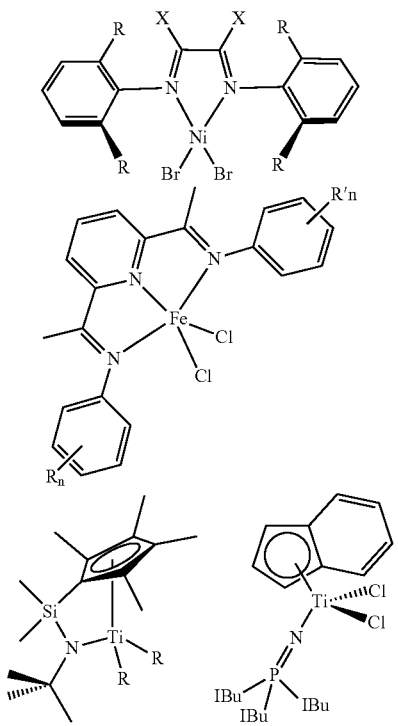

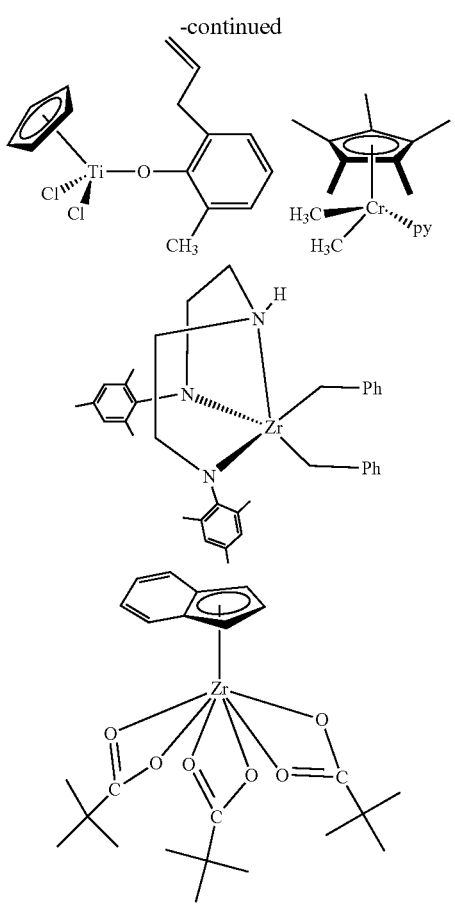

Alternatively or additionally, in certain aspects, the transition metal compound can comprise (or each transition metal compound independently can comprise) a metallocene compound. In one aspect, the transition metal compound can comprise (or at least one transition metal compound in the catalyst system can comprise) an unbridged metallocene compound. For instance, the metallocene compound can comprise an unbridged zirconium or hafnium based metallocene compound and/or an unbridged zirconium and/or hafnium based dinuclear metallocene compound. In another aspect, the metallocene compound can comprise an unbridged zirconium or hafnium based metallocene compound containing two indenyl groups or a cyclopentadienyl and an indenyl group. In yet another aspect, the metallocene compound can comprise an unbridged zirconium or hafnium based metallocene compound containing two indenyl groups. In still another aspect, the metallocene compound can comprise an unbridged zirconium or hafnium based metallocene compound containing a cyclopentadienyl and an indenyl group.

In an aspect, the metallocene compound can comprise an unbridged zirconium based metallocene compound containing two indenyl groups or a cyclopentadienyl and an indenyl group, while in another aspect, the metallocene compound can comprise a dinuclear unbridged metallocene compound with an alkenyl linking group.

Illustrative and non-limiting examples of unbridged metallocene compounds that are suitable for use as transition metal compounds described herein can include the following compounds (Ph=phenyl, stereochemistry not shown):

(1)
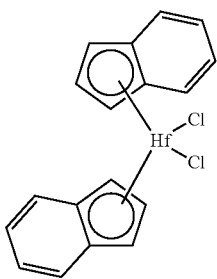

(2)
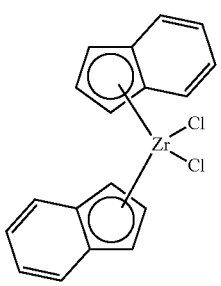

(5)
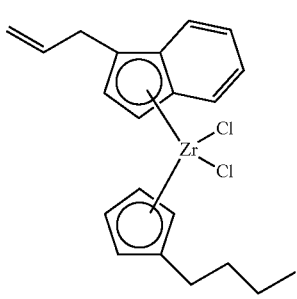

(6)
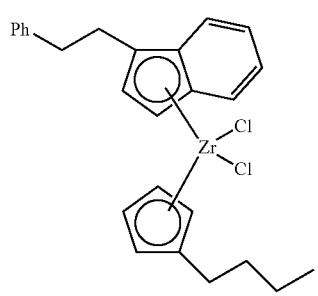

(7)
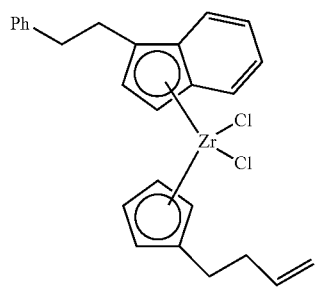

(8)
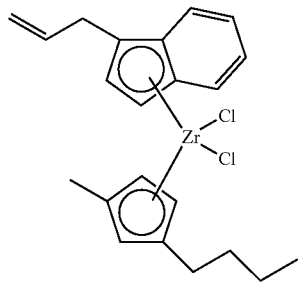

(9)
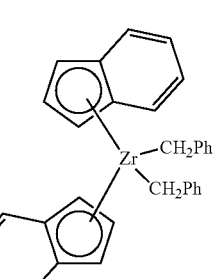

(10)
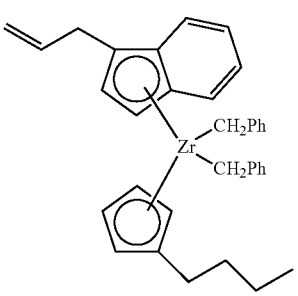

(11)
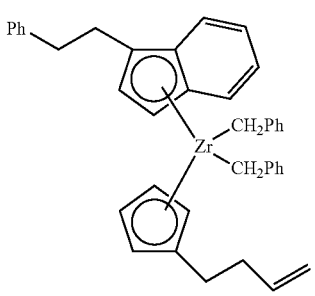

and the like, as well as combinations thereof.

The transition metal compound(s) is/are not limited solely to unbridged metallocene compounds such as described above, or to suitable unbridged metallocene compounds disclosed in U.S. Pat. Nos. 7,199,073, 7,226,886, 7,312,283, and 7,619,047, which are incorporated herein by reference in their entirety. For example, the transition metal compound(s) can comprise an unbridged dinuclear metallocene compound, such as those described in U.S. Pat. Nos. 7,919,639 and 8,080,681, the disclosures of which are incorporated herein by reference in their entirety. Illustrative and non-limiting examples of dinuclear metallocene compounds suitable for use in the present invention can include the following compounds (stereochemistry not shown):

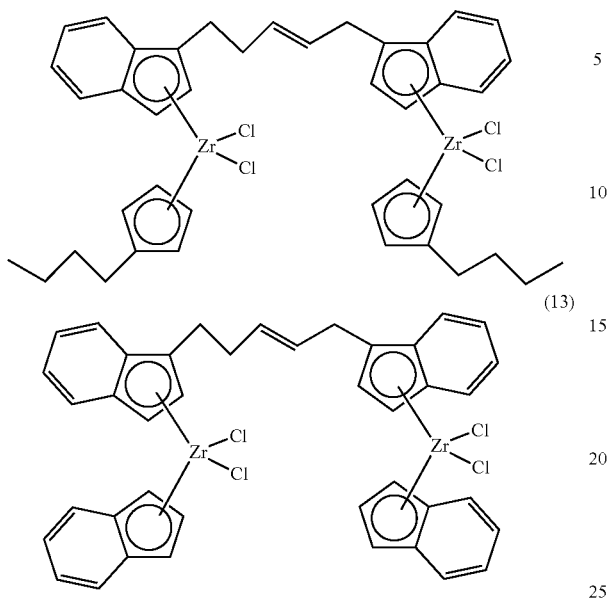

(12)

(13)

and the like, as well as combinations thereof.

The transition metal compound can comprise (or at least one transition metal compound in the catalyst system can comprise) a bridged metallocene compound in aspects of this invention. For example, the bridged metallocene compound can comprise a bridged zirconium or hafnium based metallocene compound. In another aspect, the bridged metallocene compound can comprise a bridged zirconium or hafnium based metallocene compound with an alkenyl substituent. In yet another aspect, the bridged metallocene compound can comprise a bridged zirconium or hafnium based metallocene compound with an alkenyl substituent and a fluorenyl group. In still another aspect, the bridged metallocene compound can comprise a bridged zirconium or hafnium based metallocene compound with a cyclopentadienyl group and a fluorenyl group, and with an alkenyl substituent on the bridging group and/or on the cyclopentadienyl group.

In an aspect, the bridged metallocene compound can comprise a single atom bridged metallocene compound with a fluorenyl group. In another aspect, the bridged metallocene compound can comprise a single atom bridged metallocene compound with a fluorenyl group and either a cyclopentadienyl group or an indenyl group. In yet another aspect, the bridged metallocene compound can comprise a single atom bridged metallocene compound with a fluorenyl group and a cyclopentadienyl group. In still another aspect, the bridged metallocene compound can comprise a single atom bridged metallocene compound with a fluorenyl group and an indenyl group.

In these and other aspects, the bridged metallocene compound can contain an aryl substituent (e.g., a phenyl group) on the bridging atom. Additionally or alternatively, the bridged metallocene compound can contain an alkenyl substituent, for example, on the bridging atom, and/or on the fluorenyl group, and/or on the cyclopentadienyl or indenyl group.

Illustrative and non-limiting examples of suitable bridged metallocene compounds encompassed herein can include the following compounds (Me=methyl, Ph=phenyl, t-Bu=tert-butyl, stereochemistry not shown):

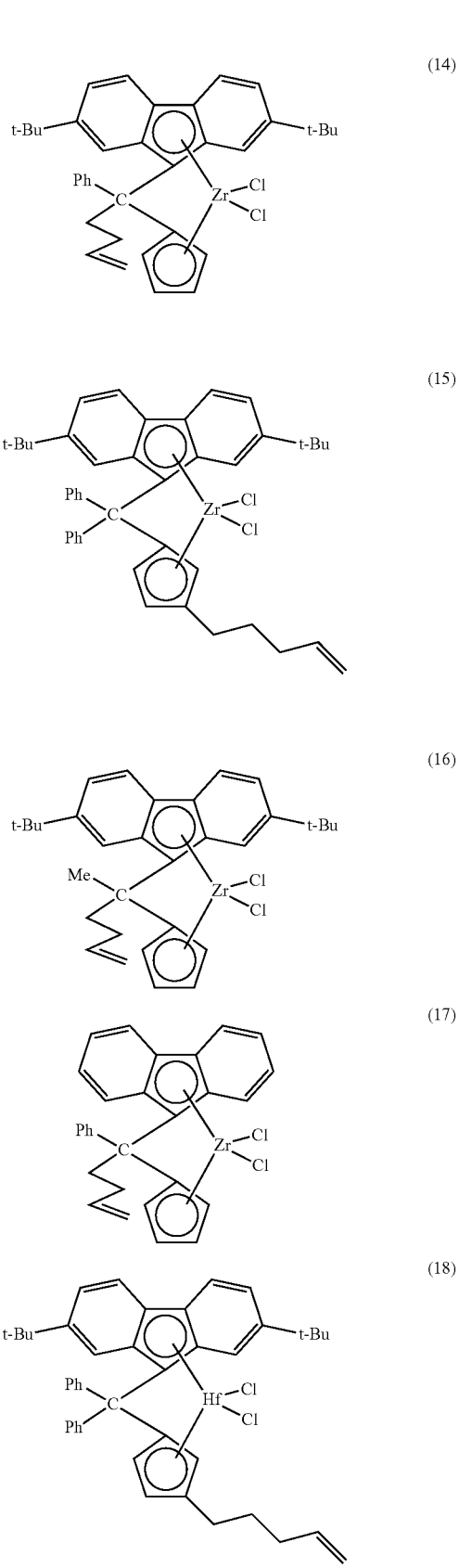

(14)

(15)

(16)

(17)

(18)

(19)
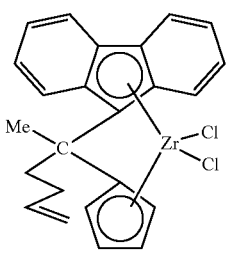
(20)
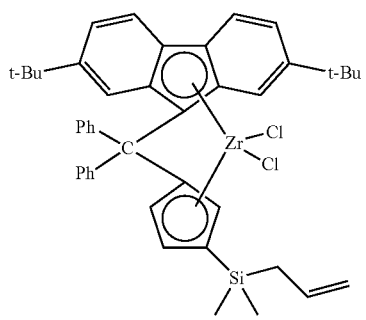
(21)
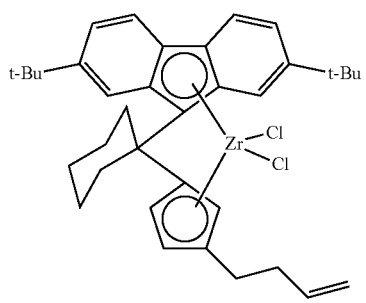
(22)
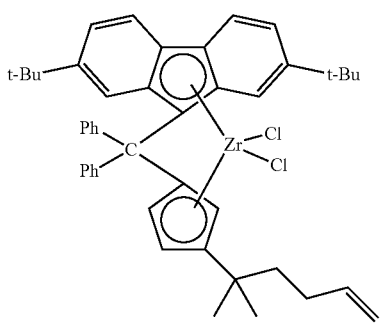
(23)
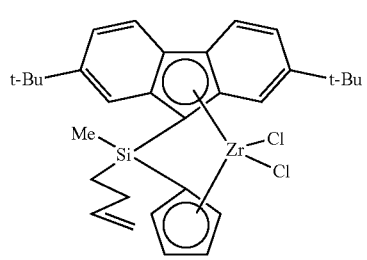
(24)
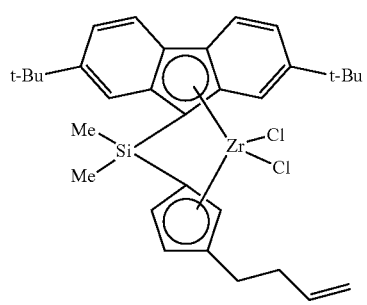
(25)
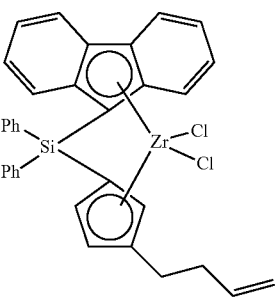
and the like, as well as combinations thereof.
Further examples of bridged metallocene compounds that are suitable for use as described herein can include, but are not limited to, the following compounds (stereochemistry not shown):
(26)
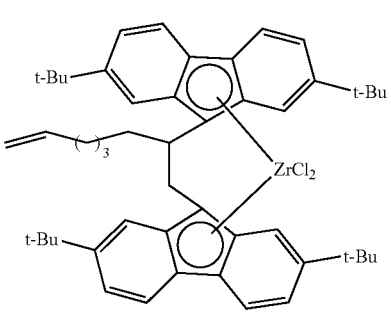
(27)
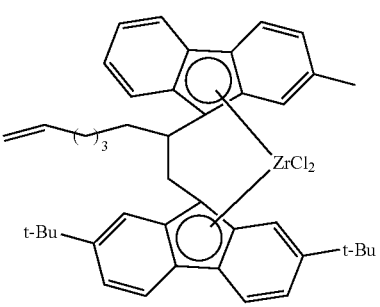

(28)

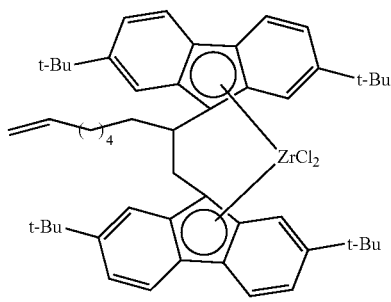

(29)

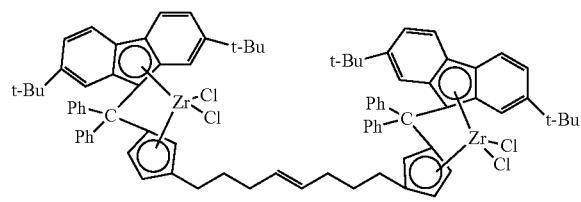

and the like, as well as combinations thereof.

The transition metal compound(s) is/are not limited solely to the bridged metallocene compounds such as described above. Other suitable bridged metallocene compounds are disclosed in U.S. Pat. Nos. 7,026,494, 7,041,617, 7,226,886, 7,312,283, 7,517,939, 7,619,047, 8,288,487, 8,329,834, 8,629,292, and 9,040,642, all of which are incorporated herein by reference in their entirety.

In particular aspects of this invention, the catalyst system can contain two metallocene compounds, for example, two different unbridged metallocene compounds, two different bridged metallocene compounds, or a bridged metallocene compound and an unbridged metallocene compound. When two transition metal compounds (or two metallocene compounds) are present, the weight ratio of the first compound to the second compound (first:second) typical can range from about 50:1 to about 1:50, from about 10:1 to about 1:10, from about 5:1 to about 1:5, from about 4:1 to about 1:4, from about 3:1 to about 1:3, from about 2:1 to about 1:2, from about 1.5:1 to about 1:1.5, or from about 1.2:1 to about 1:1.2.

The catalyst system, in addition to the transition metal compound(s), can comprise an activated chemically-treated solid oxide (one or more) and an optional co-catalyst. Illustrative co-catalysts can include, but are not limited to, aluminoxane compounds, organoboron or organoborate compounds, ionizing ionic compounds, organoaluminum (e.g., alkyl aluminum) compounds, and the like, as well as combinations thereof. Representative organoaluminum compounds can include, but are not limited to, trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, including combinations thereof.

Co-catalysts that can be used in the catalyst systems of this invention are not limited to the co-catalysts described above. Other suitable co-catalysts are well known to those of skill in the art including, for example, those disclosed in U.S. Pat. Nos. 3,242,099, 4,794,096, 4,808,561, 5,576,259, 5,807,938, 5,919,983, 7,294,599 7,601,665, 7,884,163, 8,114,946, and 8,309,485, which are incorporated herein by reference in their entirety.

Chemically-Treated Solid Oxides

The present invention encompasses various catalyst compositions that can contain a chemically-treated solid oxide. In one aspect, the chemically-treated solid oxide can comprise a solid oxide treated with an electron-withdrawing anion. Alternatively, in another aspect, the chemically-treated solid oxide can comprise a solid oxide treated with an electron-withdrawing anion, the solid oxide containing a Lewis-acidic metal ion. Non-limiting examples of suitable chemically-treated solid oxide are disclosed in, for instance, U.S. Pat. Nos. 7,294,599, 7,601,665, 7,884,163, 8,309,485, 8,623,973, and 8,703,886, which are incorporated herein by reference in their entirety.

The solid oxide can encompass oxide materials such as alumina, "mixed oxides" thereof such as silica-alumina, coatings of one oxide on another, and combinations and mixtures thereof. The mixed oxides such as silica-alumina can be single or multiple chemical phases with more than one metal combined with oxygen to form the solid oxide. Examples of mixed oxides that can be used to form a chemically-treated solid oxide, either singly or in combination, can include, but are not limited to, silica-alumina, silica-titania, silica-zirconia, alumina-titania, alumina-zirconia, zinc-aluminate, alumina-bona, silica-boria, aluminophosphate-silica, titania-zirconia, and the like. The solid oxide used herein also can encompass oxide materials such as silica-coated alumina, as described in U.S. Pat. No. 7,884,163.

Accordingly, in one aspect, the solid oxide can comprise silica, alumina, silica-alumina, silica-coated alumina, aluminum phosphate, aluminophosphate, heteropolytungstate, titania, silica-titania, zirconia, silica-zirconia, magnesia, boria, zinc oxide, any mixed oxide thereof, or any combination thereof. In another aspect, the solid oxide can comprise alumina, silica-alumina, silica-coated alumina, aluminum phosphate, aluminophosphate, heteropolytungstate, titania, silica-titania, zirconia, silica-zirconia, magnesia, boria, or zinc oxide, as well as any mixed oxide thereof, or any mixture thereof. In another aspect, the solid oxide can comprise silica, alumina, titania, zirconia, magnesia, boria, zinc oxide, any mixed oxide thereof, or any combination thereof. In yet another aspect, the solid oxide can comprise silica-alumina, silica-coated alumina, silica-titania, silica-zirconia, alumina-boria, or any combination thereof. In still another aspect, the solid oxide can comprise alumina, silica-alumina, silica-coated alumina, or any mixture thereof alternatively, alumina; alternatively, silica-alumina; or alternatively, silica-coated alumina.

The silica-alumina or silica-coated alumina solid oxide materials which can be used can have an silica content from about 5% by weight to about 95% by weight. In one aspect, the silica content of these solid oxides can be from about 10% by weight to about 80% silica by weight, or from about 20% by weight to about 70% silica by weight. In another aspect, such materials can have silica contents ranging from about 15% to about 60% silica by weight, or from about 25% to about 50% silica by weight. The solid oxides contemplated herein can have any suitable surface area, pore volume, and particle size, as would be recognized by those of skill in the art.

The electron-withdrawing component used to treat the solid oxide can be any component that increases the Lewis or Brønsted acidity of the solid oxide upon treatment (as compared to the solid oxide that is not treated with at least one electron-withdrawing anion).

According to one aspect, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, tungstate, molybdate, and the like, including mixtures and combinations thereof. In addition, other ionic or non-ionic compounds that serve as sources for these electron-withdrawing anions also can be employed. It is contemplated that the electron-withdrawing anion can be, or can comprise, fluoride, chloride, bromide, phosphate, triflate, bisulfate, or sulfate, and the like, or any combination thereof, in some aspects provided herein. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof. Yet, in other aspects, the electron-withdrawing anion can comprise fluoride and/or sulfate.

The chemically-treated solid oxide generally can contain from about 1 wt. % to about 25 wt. % of the electron-withdrawing anion, based on the weight of the chemically-treated solid oxide. In particular aspects provided herein, the chemically-treated solid oxide can contain from about 1 to about 20 wt. %, from about 2 wt. % to about 20 wt. %, from about 3 wt. % to about 20 wt. %, from about 2 wt. % to about 15 wt. %, from about 3 wt. % to about 15 wt. %, from about 3 wt. % to about 12 wt. %, or from about 4 wt. % to about 10 wt. %, of the electron-withdrawing anion, based on the total weight of the chemically-treated solid oxide.

In an aspect, the chemically-treated solid oxide (whether in activated or unactivated form) can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titanic, fluorided silica-coated alumina, fluorided-chlorided silica-coated alumina, sulfated silica-coated alumina, phosphated silica-coated alumina, and the like, as well as any mixture or combination thereof. In another aspect, the chemically-treated solid oxide employed in the catalyst systems described herein can be, or can comprise, a fluorided solid oxide and/or a sulfated solid oxide, non-limiting examples of which can include fluorided alumina, sulfated alumina, fluorided silica-alumina, sulfated silica-alumina, fluorided silica-zirconia, fluorided silica-coated alumina, sulfated silica-coated alumina, and the like, as well as combinations thereof. In yet another aspect, the chemically-treated solid oxide can comprise fluorided alumina; alternatively, chlorided alumina; alternatively, sulfated alumina; alternatively, fluorided silica-alumina; alternatively, sulfated silica-alumina; alternatively, fluorided silica-zirconia; alternatively, chlorided silica-zirconia; alternatively, sulfated silica-coated alumina; alternatively, fluorided-chlorided silica-coated alumina; or alternatively, fluorided silica-coated alumina. In some aspects, the chemically-treated solid oxide can comprise a fluorided solid oxide, while in other aspects, the chemically-treated solid oxide can comprise a sulfated solid oxide.

Various processes can be used to form chemically-treated solid oxide useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485, which are incorporated herein by reference in their entirety. Other suitable processes and procedures for preparing chemically-treated solid oxide (e.g., fluorided solid oxides and sulfated solid oxides) are well known to those of skill in the art.

Olefin Monomers and Olefin Polymers

Olefin monomers contemplated herein typically include olefin compounds having from 2 to 30 carbon atoms per molecule and having at least one olefinic double bond. Homopolymerization processes using a single olefin, such as ethylene, propylene, butene, hexene, octene, and the like, are encompassed, as well as copolymerization, homopolymerization, terpolymerization, and similar polymerization reactions using an olefin monomer with at least one different olefinic compound. Polymerization processes herein are meant to encompass oligomerization processes as well.

As an example, any resultant ethylene copolymers or terpolymers generally can contain a major amount of ethylene (>50 mole percent) and a minor amount of comonomer (<50 mole percent). Comonomers that can be copolymerized with ethylene often have from 3 to 20 carbon atoms in their molecular chain.

Acyclic, cyclic, polycyclic, terminal (α), internal, linear, branched, substituted, unsubstituted, functionalized, and non-functionalized olefins can be employed. For example, typical unsaturated compounds that can be polymerized to produce olefin polymers can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene also can be employed as a monomer or as a comonomer. In an aspect, the olefin monomer can comprise a $C_2$-$C_{24}$ olefin; alternatively, a $C_2$-$C_{12}$ olefin; alternatively, a $C_6$-$C_{24}$ olefin; alternatively, a $C_2$-$C_{10}$ α-olefin; alternatively, propylene, 1-butene, 1-pentene, 1-hexene, 1-heptene, 1-octene, 1-decene, or styrene; alternatively, ethylene, propylene, 1-butene, 1-hexene, or 1-octene; alternatively, ethylene or propylene; alternatively, ethylene; or alternatively, propylene.

When a copolymer (or alternatively, a terpolymer) is desired, the olefin monomer can comprise, for example, ethylene or propylene, which is copolymerized with at least one comonomer. According to one aspect, the olefin monomer in the polymerization process can comprise ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another aspect, the olefin monomer can comprise ethylene and the olefin comonomer can comprise an α-olefin, while in yet another aspect, the comonomer can comprise propylene, 1-butene, 1-pentene, 1-hexene, 1-octene, 1-decene, styrene, or any combination thereof or alternatively, the olefin comonomer can comprise 1-butene, 1-hexene, 1-octene, or a combination thereof.

Generally, the amount of comonomer introduced into a polymerization reactor to produce the copolymer can be from about 0.01 weight percent (wt. %) to about 50 weight percent of the comonomer based on the total weight of the monomer and comonomer. According to another aspect, the amount of comonomer introduced into a polymerization reactor can be from about 0.01 weight percent to about 40 weight percent comonomer based on the total weight of the monomer and comonomer. In still another aspect, the amount of comonomer introduced into a polymerization reactor can be from about 0.1 weight percent to about 35 weight percent comonomer based on the total weight of the monomer and comonomer. Yet, in another aspect, the amount of comonomer introduced into a polymerization reactor can be from about 0.5 weight percent to about 20 weight percent comonomer based on the total weight of the monomer and comonomer.

According to one aspect, at least one monomer/reactant can be ethylene, so the polymerization reaction can be a homopolymerization involving only ethylene, or a copolymerization with a different acyclic, cyclic, terminal, internal, linear, branched, substituted, or unsubstituted olefin. In addition, the methods disclosed herein intend for olefin to also encompass diolefin compounds that include, but are not limited to, 1,3-butadiene, isoprene, 1,4-pentadiene, 1,5-hexadiene, and the like.

Olefin polymers encompassed herein can include any polymer (or oligomer) produced from any olefin monomer (and optional comonomer(s)) described herein. For example, the olefin polymer can comprise an ethylene homopolymer, a propylene homopolymer, an ethylene copolymer (e.g., ethylene/1-butene, ethylene/1-hexene, or ethylene/1-octene), a propylene random copolymer, a propylene block copolymer, and the like, including combinations thereof. Moreover, the olefin polymer (or oligomer) can comprise, in certain aspects, an olefin dimer, olefin trimer, or olefin tetramer, and including mixtures or combinations thereof. Thus, olefin polymer encompasses oligomerization products of $C_6$-$C_{24}$ olefins (or $C_6$-$C_{24}$ α-olefins, or 1-hexene, or 1-octene, or 1-decene, or 1-dodecene, or 1-tetradecene, or 1-hexadecene).

Catalyst Preparation

The disclosed methods for determining a catalytic activity of an activated chemically-treated solid oxide also can be utilized in a process for preparing a catalyst composition. One such process for preparing a catalyst composition can comprise (I) determining a catalytic activity of an activated chemically-treated solid oxide, wherein the catalytic activity is determined via any method described herein, (II) contacting a transition metal compound, the activated chemically-treated solid oxide, and an optional co-catalyst (e.g., in a catalyst preparation vessel) to form the catalyst composition, and (III) adjusting a relative amount of at least one component of the catalyst composition based on the catalytic activity of the activated chemically-treated solid oxide (or based on the determined catalytic activity). Hence, the flow rate (or feed rate) of a component of the catalyst composition can be adjusted, manually and/or automatically, based on the determined activity. Generally, the features of the processes for preparing catalyst compositions disclosed herein (e.g., the chemically-treated solid oxide, the transition metal compound, the co-catalyst, the method of determining the catalytic activity, and the flow rate control of a catalyst system component, among others) are independently described herein, and can be combined in any combination to further describe the disclosed processes. Moreover, other steps can be conducted before, during, and/or after any of the steps listed in the disclosed processes, unless stated otherwise.

Step (I) is directed to determining a catalytic activity of the activated chemically-treated solid oxide using a color measurement technique. Accordingly, the specific features relating to step (I) can be the same as those disclosed and described herein as it pertains to methods for determining the catalytic activity of an activated chemically-treated solid oxide.

In step (II), a catalyst composition is formed from the transition metal compound, the activated chemically-treated solid oxide, and the optional co-catalyst. In one aspect, the catalyst composition does not contain co-catalyst, while in another aspect, and more often, the catalyst composition contains a co-catalyst. Likewise, in some aspects, only one transition metal compound is present in the catalyst compositions, whereas in other aspects, two or more transition metal compounds are present in the catalyst composition.

The catalyst composition can be formed by combining the respective components in any order or in any manner. For example, the transition metal compound(s) and the co-catalyst can be contacted with a mixture of the activated chemically-treated solid oxide in a diluent in step (II). While not limited thereto, the diluent can be any hydrocarbon solvent disclosed herein. In another example, a first solution of the transition metal compound(s) and a second solution of the co-catalyst can be contacted with the activated chemically-treated solid oxide in step (II). As above, the first and second solutions can utilize any suitable hydrocarbon solvent, although not limited thereto.

The processes disclosed herein are applicable to a wide variety of circumstances where the catalytic activity of the activated chemically-treated solid oxide may be of interest. For instance, when the catalytic activity of the activated chemically-treated solid oxide is too low, the relative amount of the activated chemically-treated solid oxide can be adjusted (increased) in step (III)—relatively more of the activated chemically-treated solid oxide can be fed to the catalyst preparation vessel. Thus, the overall amount of "active" chemically-treated solid oxide in the catalyst preparation vessel is increased due to the increased relative amount of the chemically-treated solid oxide.

Optionally, the disclosed processes for preparing a catalyst composition can further comprise—based on the catalytic activity of the activated chemically-treated solid oxide—adjusting a relative amount of the transition metal compound and/or the co-catalyst in step (III). For instance, a higher relative concentration of the transition metal compound in the catalyst composition can be used to compensate for a lower catalytic activity of the activated chemically-treated solid oxide.

In another aspect of this invention, a catalyst preparation system is provided, and in this aspect, the catalyst preparation system can comprise (a) a catalyst preparation vessel configured to contact a transition metal compound, an activated chemically-treated solid oxide, and an optional co-catalyst to form a catalyst composition, (b) an activator feed stream configured to introduce the activated chemically-treated solid oxide into the catalyst preparation vessel, (c) a transition metal compound feed stream configured to introduce the transition metal compound into the catalyst preparation vessel, (d) a catalyst system feed stream configured to withdraw the catalyst composition from the catalyst preparation vessel (e.g., and to introduce the catalyst composition into a reactor, if desired), and (e) an analytical system configured to determine a catalytic activity of the activated chemically-treated solid oxide prior to introducing the activated chemically-treated solid oxide into the catalyst preparation vessel.

Generally, the features of any of the catalyst preparation systems disclosed herein (e.g., the catalyst preparation vessel, the activator feed stream, the transition metal compound feed stream, the catalyst system feed stream, and the analytical system, among others) are independently described herein, and these features can be combined in any combination to further describe the disclosed catalyst preparation systems. Moreover, other devices or catalyst preparation system components can be present in the disclosed catalyst preparation systems, unless stated otherwise. For instance, the catalyst preparation system can further include a co-catalyst feed stream configured to introduce a co-catalyst into the catalyst preparation vessel. Alternatively, the co-catalyst feed stream can be combined with the activator feed stream (pre-contacted), and then the resulting pre-contacted mixture can be fed into the catalyst preparation vessel.

Referring first to the analytical system, which can include any analytical system or device that is configured to determine the catalytic activity of the activated chemically-treated solid oxide prior to introducing the activated chemically-treated solid oxide into the catalyst preparation vessel. For instance, the analytical system can include a suitable color measurement instrument or color analyzer, for instance, a smartphone, a spectrophotometer, a colorimeter, and the like. In one aspect of this invention, the analytical system can comprise a color analyzer for measuring a color of the activated chemically-treated solid oxide after contacting the activated chemically-treated solid oxide with a color indicator solution, and a computer system for generating a color number (e.g., R+G+B) of the treated solid support and for correlating the color number to a standard to determine the catalytic activity of the activated chemically-treated solid oxide. The computer system can be "built-in" or integrated with the color analyzer, or the computer system can be external, such that the external computer system takes the output from the color analyzer and determines the catalytic activity. As described herein, the standard can comprise a calibration curve, and the step of correlating can comprise any suitable technique for converting the color number into the catalytic activity of the activated chemically-treated solid oxide, such as a mathematical model. Moreover, the analytical system can further comprise a washing system configured to clean the color analyzer after a measurement cycle (and before the next measurement cycle).

The catalyst preparation vessel can include any vessel or apparatus that is capable of contacting (e.g., mixing or blending) two or more components of a catalyst system to form the catalyst composition. The catalyst preparation vessel can be a mixing tank or other suitable stirred tank or vessel. The catalyst composition can be delivered from the catalyst preparation vessel to the reactor via the catalyst system feed stream, as needed. Often, in the catalyst preparation vessel, the transition metal compound (e.g., one, two, or three) and the activated chemically-treated solid oxide are contacted, or alternatively, the transition metal compound (e.g., one, two, or three), the activated chemically-treated solid oxide, and a co-catalyst are contacted, to form the catalyst system. Multi-component catalyst preparation vessels and methods are disclosed in, for instance, U.S. Pat. No. 7,615,596 (e.g., a pre-contactor), which is incorporated herein by reference in its entirety. In one aspect, for example, only one transition metal compound is present in (a). In another aspect, two or more transition metal compounds are present in (a), and (c) includes a single feed stream for introducing a mixture of the transition metal compounds into the catalyst preparation vessel, or (c) includes separate transition metal compound feed streams for separately introducing each transition metal compound into the catalyst preparation vessel.

The catalyst preparation system can further comprise (f) a controller that is configured to control a flow rate of the activator feed stream and/or a flow rate of the transition metal compound feed stream (and/or a flow rate of the co-catalyst, if used) into the catalyst preparation vessel based on, or according to, the catalytic activity determined by the analytical system. For the catalyst preparation system, any of the features or options for the controller can be the same as those disclosed herein for the polymerization reactor system, or for the processes of operating the polymerization reactor system. Accordingly, based on the catalytic activity determined by the analytical system, the flow rate of the activator feed stream into the catalyst preparation vessel can be increased or decreased; additionally or alternatively, the flow rate of the transition metal compound feed stream can be increased or decreased; and additionally or alternatively, the flow rate of the co-catalyst feed stream can be increased or decreased.

The adjustment to the relative amount of the particular catalyst component can be readily ascertained by one of skill in the art depending upon, for instance, the historic and the prevailing conditions in the catalyst preparation vessel and the overall composition (e.g., the desired composition) of the catalyst composition.

As disclosed herein, the transition metal compound (or each transition metal compound independently) can comprise any suitable transition metal compound, whether a non-metallocene compound, a bridged metallocene compound, an unbridged metallocene compound, and so forth. Likewise, the co-catalyst (when present) can comprise any suitable co-catalyst or any co-catalyst disclosed herein. In particular aspects of this invention, the co-catalyst can comprise an organoaluminum compound, such as trimethylaluminum, triethylaluminum, triisobutylaluminum, and the like.

A representative catalyst preparation system 200 consistent with aspects of this invention is illustrated in FIG. 2. The catalyst preparation system 200 includes a catalyst preparation vessel 260, an analytical system 280, and a controller 290. A reactor 270 also is shown in FIG. 2, and catalyst system feed stream 265 exits the catalyst preparation vessel 260 and passes thru valve V210 prior to its entry into the reactor 270. The catalyst preparation system 200 includes a transition metal compound feed stream 252, a co-catalyst feed stream 254, and an activator feed stream 255 to the catalyst preparation vessel 260. As shown in FIG. 2, a sample stream 258 from the activator feed stream 255 from an activator mix tank 250 to the catalyst preparation vessel 260 can be submitted to the analytical system 280 for determination of the catalytic activity of the activated chemically-treated solid oxide prior to its entry into the catalyst preparation vessel 260.

Solid activated chemically-treated solid oxide in a storage vessel 240 is conveyed via line 245 and valve V201 to the activator mix tank 250, where it is typically combined with a small amount of a diluent to form a flowable mud-like consistency or a larger amount of a diluent to form a slurry of dilute solids. The activator feed stream 255 exits the mix tank 250 and generally passes through valves V202 and V203 to the catalyst preparation vessel 260. Periodically, the sample stream 258 is taken from the activator feed stream 255 for analysis (by the analytical system 280) by closing valve V203 and opening valve V204.

The sample stream 258 passes thru valve V205 and into the color analyzer and computer system 210, which can include any suitable sample chamber for containing the sample during analysis. Here, the sample stream 258—which contains the activated chemically-treated solid oxide—is combined with a color indicator solution 206 via line 208 and valves V207 and V208. After analysis, valve V207 is closed and valve V206 is opened, to allow washing solution 202 to flow thru line 204 and valves V206 and V208 to wash or evacuate the sample chamber thru line 215 and valve V209 into a disposal container 205.

Information or data 285 on the catalytic activity from the analytical system 280 can be provided to controller 290, which can then control or adjust 295 a flow rate of the activator feed stream 255, and/or a flow rate of the co-catalyst feed stream 254, and/or a flow rate of the transition metal feed stream 252 to catalyst preparation vessel 260. Thus, the controller 290 controls or adjusts 285 a flow rate of the activator feed stream 255, a flow rate of the co-catalyst feed stream 254, and/or a flow rate of the transition metal compound feed stream 252 into the catalyst preparation vessel 260 based on, or according to, the catalytic activity determined by the analytical system 280. The controller 290 also can be further configured to control the opening/closing functions of the valves in the system, and their sequence, periodicity, and duration.

Activation Systems

Also encompassed herein are activation systems, which can use utilized alone or in conjunction with the above-described catalyst preparation systems and polymerization reactor systems. One such activation system can comprise (a) an activation vessel configured to calcine a raw (or unactivated) chemically-treated solid oxide to form an activated chemically-treated solid oxide, (b) an activator storage vessel configured to receive the activated chemically-treated solid oxide from the activation vessel and further configured to introduce the activated chemically-treated solid oxide into a catalyst preparation vessel, and (c) an analytical system configured to determine a catalytic activity of the activated chemically-treated solid oxide prior to introducing the activated chemically-treated solid oxide into the catalyst preparation vessel.

Similar to the catalyst preparation system, the analytical system can include any analytical system or device that is configured to determine the catalytic activity of the activated chemically-treated solid oxide prior to introducing the activated chemically-treated solid oxide into the catalyst preparation vessel. As such, the analytical system can include a suitable color measurement instrument or color analyzer, for instance, a smartphone, a spectrophotometer, a colorimeter, and the like. In one aspect of this invention, the analytical system can comprise a color analyzer for measuring a color of the activated chemically-treated solid oxide after contacting the activated chemically-treated solid oxide with a color indicator solution, and a computer system for generating a color number (e.g., R+G+B) of the treated solid support and for correlating the color number to a standard to determine the catalytic activity of the activated chemically-treated solid oxide. The computer system can be "built-in" or integrated with the color analyzer, or the computer system can be external, such that the external computer system takes the output from the color analyzer and determines the catalytic activity. As described herein, the standard can comprise a calibration curve, and the step of correlating can comprise any suitable technique for converting the color number into the catalytic activity of the activated chemically-treated solid oxide, such as a mathematical model. Moreover, the analytical system can further comprise a washing system configured to clean the color analyzer after a measurement cycle (and before the next measurement cycle).

The activation vessel can be a batch or continuous device that calcines the unactivated chemically-treated solid oxide to form an activated chemically-treated solid oxide. The operating conditions for such calcining devices/vessels are well known, and are described in many of the patents already referenced herein. For instance, calcining can be performed in an ambient (air) atmosphere at a temperature of from about 200° C. to about 900° C. (or from about 400° C. to about 700° C., or from about 350° C. to about 550° C.) for a time period of 15 min to about 50 hr (or from about 2 hr to about 20 hr, or from about 1 hr to about 8 hr).

The activator storage vessel can include any vessel or apparatus and often can be maintained at a controlled atmosphere, such as an inert atmosphere. The activation system can further comprise (d) a controller that is configured to control a flow rate of the activated chemically-treated solid oxide from the activator storage vessel into the catalyst preparation vessel based on, or according to, the catalytic activity determined by the analytical system. In a particular aspect, if the calcining step in the activation vessel were found to be ineffective such that the catalytic activity of the activated chemically-treated solid oxide was unacceptably low, then the controller could prevent any flow whatsoever into the catalyst preparation vessel, thus preventing a large amount of off-spec catalyst (and waste) from being produced.

Figure 3:
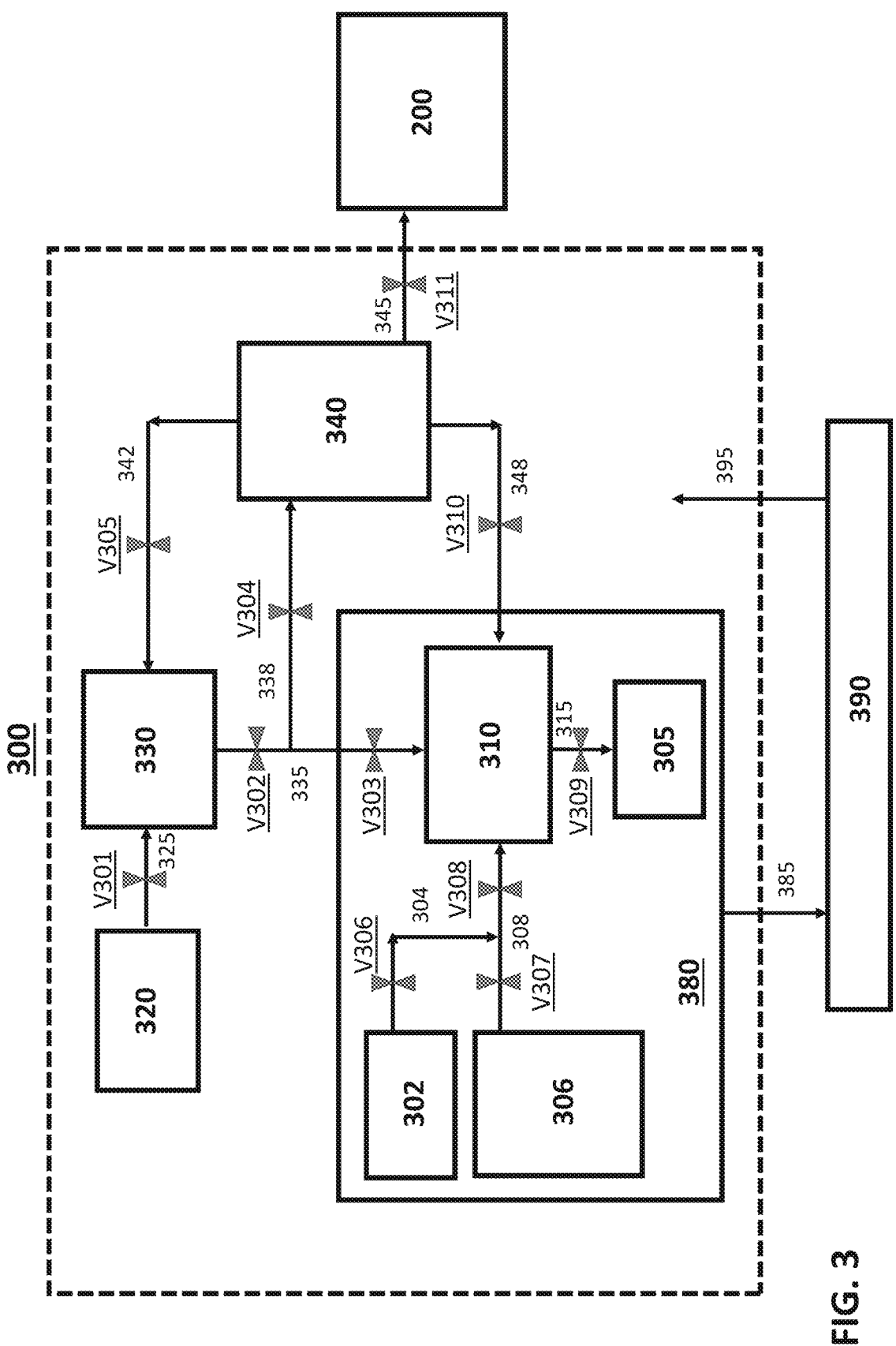
FIG. 3 illustrates a schematic block diagram of an activation system consistent with aspects of this invention.

A representative activation system 300 consistent with aspects of this invention is illustrated in FIG. 3. The activation system 300 includes an activation vessel 330, an activator storage vessel 340, an analytical system 380, and a controller 390. A catalyst preparation system 200 also is shown in FIG. 3, and activator feed stream 345 exits the activator storage vessel 340 and passes thru valve V311 prior to its entry into the catalyst preparation system 200. Raw, unactivated chemically-treated solid oxide 320 passes thru line 325 and valve V301 to the activation vessel 330 where it is calcined under suitable conditions to form an activated chemically-treated solid oxide. After passing thru valve V302, the activated chemically-treated solid oxide is transferred thru line 338 and valve V304 to the activator storage vessel 340.

As shown in FIG. 3, a sample stream 335 of the activated chemically-treated solid oxide can be submitted thru valve V303 to the analytical system 380 for determination of the catalytic activity of the activated chemically-treated solid oxide. This is accomplished by periodically closing valve V304 and opening valve V303. The sample stream 335 passes thru valve V303 and into the color analyzer and computer system 310, which can include any suitable sample chamber for containing the sample during analysis. Here, the sample stream 335—which contains the activated chemically-treated solid oxide—is combined with a color indicator solution 306 via line 308 and valves V307 and V308. After analysis, valve V307 is closed and valve V306 is opened, to allow washing solution 302 to flow thru line 304 and valves V306 and V308 to wash or evacuate the sample chamber thru line 315 and valve V309 into a disposal container 305.

Information or data 385 on the catalytic activity from the analytical system 380 can be provided to controller 390, which can then control or adjust 395 a flow rate of the activator feed stream 345 to the catalyst preparation system 200 (and catalyst preparation vessel). A second sample stream 348 from the activator storage vessel of the activated chemically-treated solid oxide can be submitted thru valve V310 to the analytical system 380 for determination of the catalytic activity of the activated chemically-treated solid oxide, entering the color analyzer and computer system 310 and its sample chamber. Likewise, information or data 385 on the catalytic activity of the second sample stream 348 from the analytical system 380 can be provided to controller 390, which can then control or adjust 395 a flow rate of the activator feed stream 345 to the catalyst preparation system 200 (and catalyst preparation vessel). Optionally, if the catalytic activity is found to be unsuitable, the contents of the activator storage vessel 340 can be recycled 342 thru valve 305 to activation vessel 330 for re-calcination/activation prior to its subsequent introduction into the catalyst preparation system 200 (catalyst preparation vessel). The controller 390 also can be further configured to control the opening/closing functions of the valves in the system, and their sequence, periodicity, and duration.

EXAMPLES

The invention is further illustrated by the following examples, which are not to be construed in any way as imposing limitations to the scope of this invention. Various other aspects, modifications, and equivalents thereof which, after reading the description herein, can suggest themselves to one of ordinary skill in the art without departing from the spirit of the present invention or the scope of the appended claims.

The polymerization experiments of Examples 1-4 were conducted for 30 min in a one-gallon stainless-steel autoclave reactor containing isobutane as diluent. A solution of a metallocene compound was prepared by dissolving approximately 20 mg in 20 mL of toluene. Under an isobutane purge, 0.4 mL of TIBA (1M in heptanes), 100 mg of a chemically-treated solid oxide (CTSO), and the metallocene solution (0.5 to 2 mg of the metallocene compound) were charged in that order to a cold reactor through a charge port. The reactor was closed, and isobutane was added. The reactor was heated to the desired run temperature of 90° C., and ethylene was then introduced into the reactor (1-hexene and hydrogen were not used). Ethylene was fed on demand to maintain the target pressure of 390 psig. The reactor was maintained at the desired temperature throughout the experiment by an automated heating-cooling system. After venting of the reactor, purging, and cooling, the resulting polymer product was dried at 50° C. under reduced pressure. The structure for the metallocene compound used in Examples 1-4 is shown below (Me=methyl; t-Bu=tert-butyl):

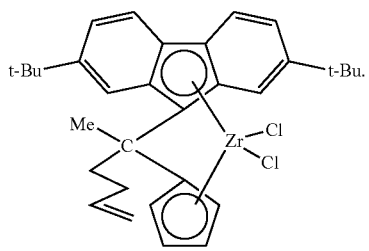

Example 1

Table 1 summarizes Example 1, in which the chemically-treated solid oxide (CTSO) was sulfated alumina (14.7 wt. % sulfate) activated/calcined at 600° C. for 3 hr in dry nitrogen, with the exception of Example 1E, in which the sulfated alumina CTSO was not activated/calcined. The sulfated alumina was prepared as follows. An alumina having a surface area of 300 m$^2$/g, a pore volume of 1.3 mL/g, and an average particle size of 100 microns, was calcined in air at 600° C. for 15 min and then allowed to cool. Next, 100 g of the alumina were impregnated with 300 mL of water into which 15 g of concentrated sulfuric acid had been dissolved. The resulting damp powder was then dried overnight under vacuum at 100° C. Calcining was performed at 600° C. by fluidizing the sulfated alumina in dry nitrogen for 3 hr, followed by cooling to room temperature while still being fluidized under nitrogen.

Examples 1A and 1E were tested for polymerization activity, and Examples 1B-1D were mixed with different amounts of water, as shown in Table 1, and then tested for polymerization activity. Water was added to the sulfated alumina CTSO by injecting water into the nitrogen stream during fluidization at room temperature.

Figure 4:
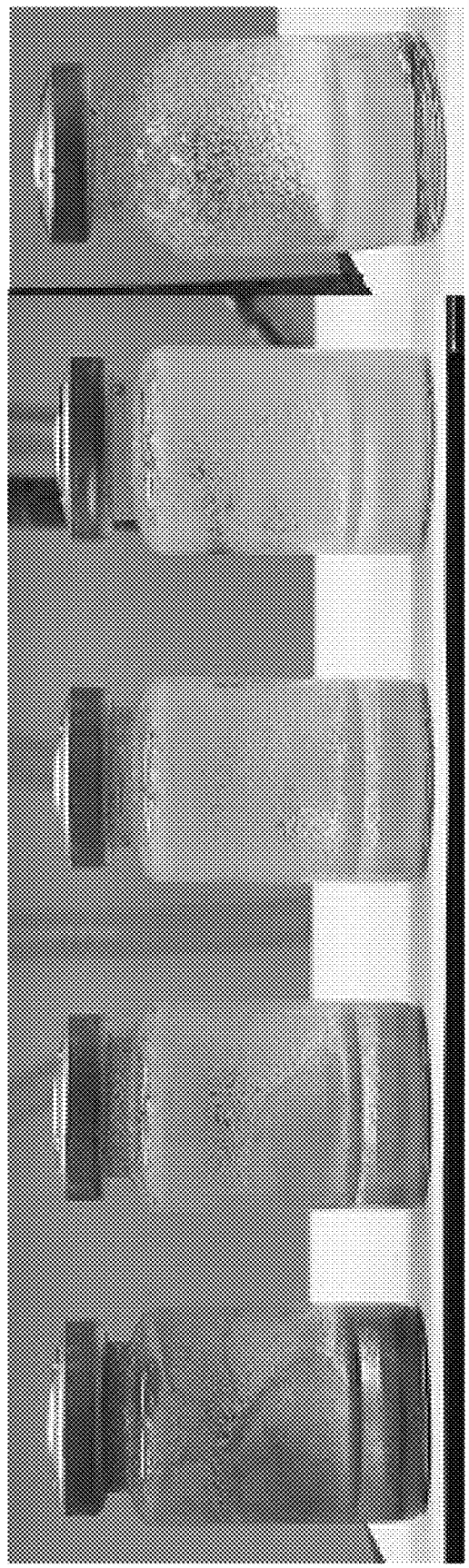
FIG. 4 presents a photograph of the different color treated solid oxides of Example 1.
Figure 5:
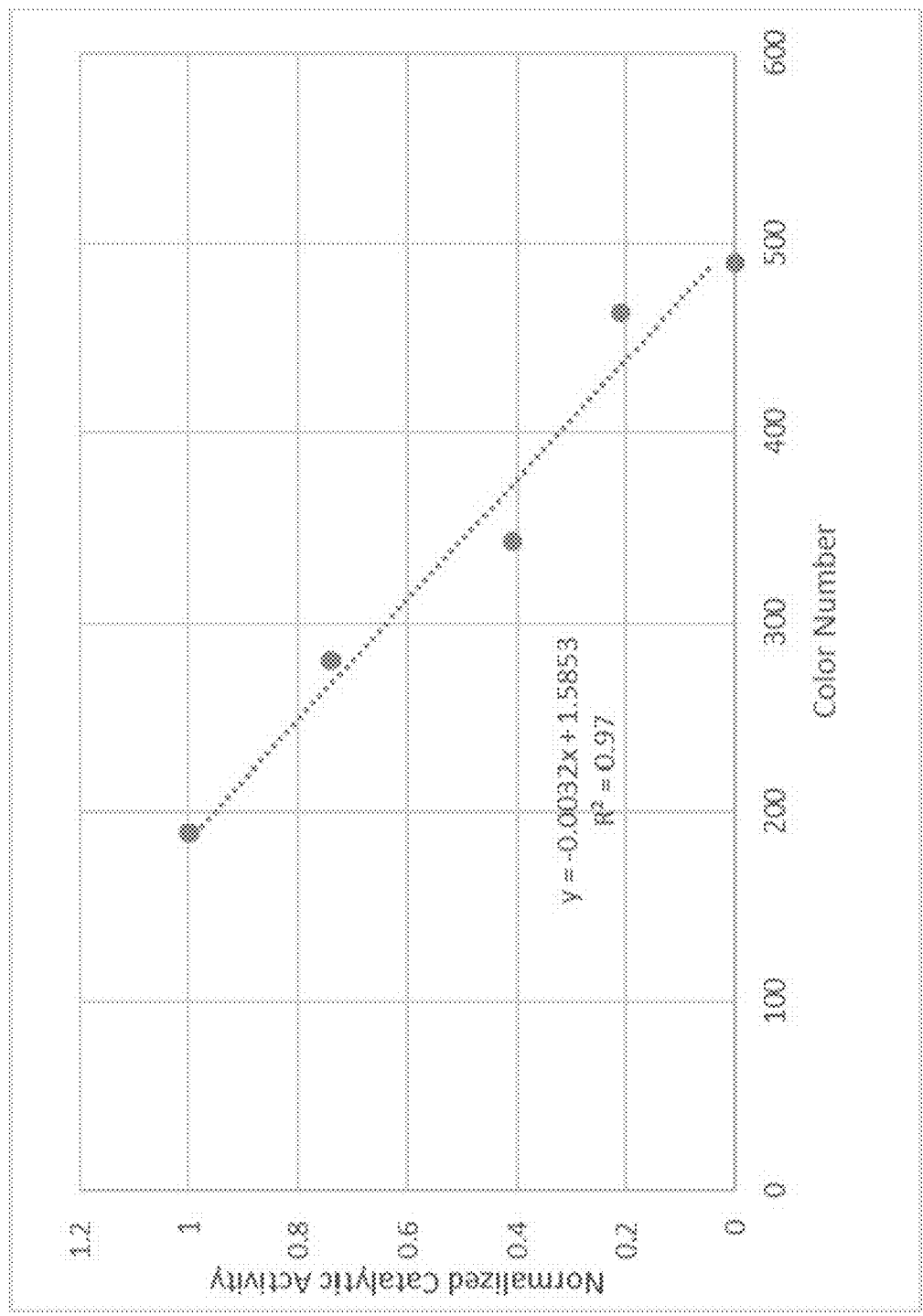
FIG. 5 presents a plot of normalized catalytic activity versus color number for the chemically-treated solid oxides of Example 1.

Further, approximate 300 mg samples of each CTSO also were mixed with a 3 mL solution of butylated hydroxytoluene (BHT) in heptane (0.05 g BHT per mL) at room temperature for 1 hr. The resulting colors of each treated solid oxide are shown in the photograph of FIG. 4, with Examples 1D-1E being white/off-white, Example 1C being yellow, Example 1B being yellow-orange, and Example 1A being reddish-orange. A color number was established for each example (R+G+B), and as shown in Table 1, there was a clear correlation between the treated solid oxide color, the color number, and catalytic activity of the CTSO in an ethylene polymerization reaction. FIG. 5 illustrates the correlation between the normalized catalytic activity of the chemically-treated solid oxide as a function of the color number. Thus, a sample of a chemically-treated solid oxide can be mixed with a color indicator solution and the resulting color number determined, and then using the linear calibration curve or mathematical relationship in FIG. 5 (statistical R$^2$ value of 0.97), the catalytic activity of the chemically-treated solid oxide can be determined without having to conduct a polymerization experiment.

Example 2

Table 2 summarizes Example 2, in which the chemically-treated solid oxide (CTSO) was fluorided silica-coated alumina (4.75 wt. % fluoride) activated/calcined at 600° C. for 3 hr in dry nitrogen, with the exception of Example 2E, in which the fluorided silica-coated alumina CTSO was not activated/calcined. The fluorided silica-coated alumina was prepared as follows. A slurry was made by mixing 400 mL of water and 100 g of silica-coated alumina (40 wt. % alumina, a surface area of 450 m$^2$/g, a pore volume of 1.3 mL/g, and an average particle size of 35 microns). A solution of concentrated hydrofluoric acid (5 g HF) was mixed into the slurry, and the resulting slurry was then spray dried to a dry flowable powder. Calcining was performed at 600° C. by fluidizing the fluorided silica-coated alumina in dry nitrogen for 3 hr, followed by cooling to room temperature while still being fluidized under nitrogen.

Examples 2A and 2E were tested for polymerization activity, and Examples 2B-2D were mixed with different amounts of water, as shown in Table 2, and then tested for polymerization activity. Water was added to the fluorided silica-coated alumina CTSO by injecting water into the nitrogen stream during fluidization at room temperature.

Further, approximate 300 mg samples of each CTSO also were mixed with a 3 mL solution of butylated hydroxytoluene (BHT) in heptane (0.05 g BHT per mL) at room temperature for 1 hr. A color number was established for each example (R+G+B), and as shown in Table 2, there was a clear correlation between the treated solid oxide color, the color number, and catalytic activity of the CTSO in an ethylene polymerization reaction. A plot similar to FIG. 5 can be constructed using the data from Table 2 to illustrate the correlation between the normalized catalytic activity of the chemically-treated solid oxide and the color number. Thus, a sample of a chemically-treated solid oxide can be mixed with a color indicator solution and the resulting color number determined, and then using a linear calibration curve or mathematical relationship based on the data in Table 2, the catalytic activity of the chemically-treated solid oxide can be determined without having to conduct a polymerization experiment.

Example 3

Table 3 summarizes Example 3, in which the chemically-treated solid oxide (CTSO) was sulfated alumina (14.7 wt. % sulfate) activated/calcined at 300-700° C. for 3 hr in dry nitrogen in a manner similar to Example 1, with the exception of Example 3F, in which the sulfated alumina CTSO was not activated/calcined. Examples 3A-3F were tested for polymerization activity, and approximate 300 mg samples of each CTSO also were mixed with a 3 mL solution of butylated hydroxytoluene (BHT) in heptane (0.05 g BHT per mL) at room temperature for 1 hr. A color number was established for each example (R+G+B), and as shown in Table 3, there was a clear correlation between the color number, the activation temperature, and the catalytic activity of the CTSO in an ethylene polymerization reaction. A plot similar to FIG. 5 can be constructed using the data from Table 3 to illustrate the correlation between the normalized catalytic activity of the chemically-treated solid oxide and the color number. Thus, a sample of a chemically-treated solid oxide can be mixed with a color indicator solution and the resulting color number determined, and then using a linear calibration curve or mathematical relationship based on the data in Table 3, the catalytic activity of the chemically-treated solid oxide can be determined without having to conduct a polymerization experiment.

Example 4

Table 4 summarizes Example 4, in which the chemically-treated solid oxide (CTSO) was fluorided silica-coated alumina (4.75 wt. % fluoride) activated/calcined at 300-700° C. for 3 hr in dry nitrogen in a manner similar to Example 2, with the exception of Example 4F, in which the CTSO was not activated/calcined. Examples 4A-4F were tested for polymerization activity, and approximate 300 mg samples of each CTSO also were mixed with a 3 mL solution of butylated hydroxytoluene (BHT) in heptane (0.05 g BHT per mL) at room temperature for 1 hr. A color number was established for each example (R+G+B), and as shown in Table 4, there was a clear correlation between the color number, the activation temperature, and the catalytic activity of the CTSO in an ethylene polymerization reaction. A plot similar to FIG. 5 can be constructed using the data from Table 4 to illustrate the correlation between the normalized catalytic activity of the chemically-treated solid oxide and the color number. Thus, a sample of a chemically-treated solid oxide can be mixed with a color indicator solution and the resulting color number determined, and then using a linear calibration curve or mathematical relationship based on the data in Table 4, the catalytic activity of the chemically-treated solid oxide can be determined without having to conduct a polymerization experiment.

TABLE 1

Summary of Example 1.

| Example | 1A | 1B | 1C | 1D | 1E |
|---|---|---|---|---|---|
| Water content (mmol/g CTSO) | 0 | 0.675 | 1.307 | 1.950 | N/A Unactivated |
| g Polymer/g CTSO | 1690 | 1250 | 700 | 360 | 0 |
| Normalized Activity | 1 | 0.74 | 0.41 | 0.21 | 0 |
| Color Number R + G + B (8 bits) | 189 | 280 | 343 | 463 | 489 |

TABLE 2

Summary of Example 2.

| Example | 2A | 2B | 2C | 2D | 2E |
|---|---|---|---|---|---|
| Water content (mmol/g CTSO) | 0 | 0.25 | 0.74 | 1.1 | N/A Unactivated |
| g Polymer/g CTSO | 1270 | 780 | 570 | 500 | 0 |
| Normalized Activity | 1 | 0.61 | 0.45 | 0.39 | 0 |
| Color Number R + G + B (8 bits) | 167 | 303 | 333 | 412 | 522 |

TABLE 3

Summary of Example 3.

| | Example | | | | | |
|---|---|---|---|---|---|---|
| | 3A | 3B | 3C | 3D | 3E | 3F |
| Activation Temperature (° C.) | 700 | 600 | 500 | 400 | 300 | N/A Unactivated |
| g Polymer/g CTSO | 1470 | 1450 | 1350 | 1230 | 530 | 0 |
| Normalized Activity | 1.01 | 1.00 | 0.93 | 0.85 | 0.37 | 0 |
| Color Number R + G + B (8 bits) | 117 | 102 | 182 | 267 | 369 | 489 |

TABLE 4

Summary of Example 4.

| | Example | | | | | |
|---|---|---|---|---|---|---|
| | 4A | 4B | 4C | 4D | 4E | 4F |
| Activation Temperature (° C.) | 700 | 600 | 500 | 400 | 300 | N/A Unactivated |
| g Polymer/g CTSO | 2730 | 2410 | 2430 | 1870 | 380 | 0 |
| Normalized Activity | 1.13 | 1.00 | 1.01 | 0.78 | 0.16 | 0 |
| Color Number R + G + B (8 bits) | 71 | 80 | 130 | 232 | 430 | 496 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of" unless specifically stated otherwise):

Aspect 1. A method for determining a catalytic activity of an activated chemically-treated solid oxide, the method comprising:
(i) combining a sample of the activated chemically-treated solid oxide with a solution of a color indicator compound to form a treated solid support;
(ii) measuring a color of the treated solid support (with any suitable color measurement instrument/device); and
(iii) generating a color number of the treated solid support, and correlating the color number to a standard to determine the catalytic activity of the activated chemically-treated solid oxide.

Aspect 2. The method defined in aspect 1, wherein the solution comprises the color indicator compound and a solvent, such as a hydrocarbon solvent.

Aspect 3. The method defined in aspect 2, wherein the hydrocarbon solvent comprises any suitable hydrocarbon compound or any hydrocarbon compound disclosed herein, e.g., pentane, hexane, heptane, benzene, toluene, or xylene, as well as mixtures or combinations thereof.

Aspect 4. A process for preparing a catalyst composition, the process comprising:
(I) determining a catalytic activity of an activated chemically-treated solid oxide, wherein the catalytic activity is determined via the method defined in any one of aspects 1-3;
(II) contacting a transition metal compound, the activated chemically-treated solid oxide, and an optional co-catalyst (e.g., in a catalyst preparation vessel) to form the catalyst composition; and
(III) adjusting a relative amount of at least one component of the catalyst composition based on the catalytic activity of the activated chemically-treated solid oxide (or based on the determined catalytic activity).

Aspect 5. The process defined in aspect 4, wherein the relative amount of the activated chemically-treated solid oxide is adjusted in step (III).

Aspect 6. The process defined in aspect 4 or 5, wherein the relative amount of the transition metal compound and/or the co-catalyst is adjusted in step (III).

Aspect 7. The process defined in any one of aspects 4-6, wherein the transition metal compound and the co-catalyst are contacted with a mixture of the activated chemically-treated solid oxide in a diluent in step (II).

Aspect 8. The process defined in any one of aspects 4-7, wherein a first solution of the transition metal compound and a second solution of the co-catalyst are contacted with the activated chemically-treated solid oxide in step (II).

Aspect 9. A process for operating a polymerization reactor system, the process comprising:
(I) determining a catalytic activity of an activated chemically-treated solid oxide, wherein the catalytic activity is determined via the method defined in any one of aspects 1-3;
(II) contacting a catalyst system comprising a transition metal compound, the activated chemically-treated solid oxide, and an optional co-catalyst, with an olefin monomer and an optional olefin comonomer in a reactor within the polymerization reactor system under polymerization reaction conditions to produce an olefin polymer; and
(III) adjusting a flow rate of the activated chemically-treated solid oxide into the reactor when the catalytic activity of the activated chemically-treated solid oxide has reached a predetermined level (or adjusting the flow rate of the chemically-treated solid oxide based on the determined activity).

Aspect 10. The process defined in aspect 9, wherein the flow rate in step (III) is controlled by adjusting a flow rate of the activated chemically-treated solid oxide to a catalyst preparation vessel, and/or by adjusting a relative flow rate (ratio of activated chemically-treated solid oxide:transition metal compound) to the catalyst preparation vessel, and/or by adjusting a flow rate of the catalyst system exiting the catalyst preparation vessel and entering the reactor.

Aspect 11. The process defined in aspect 9 or 10, wherein the process further comprises controlling a flow rate of the transition metal compound into the reactor, a flow rate of the co-catalyst into the reactor, an ethylene concentration in the reactor, a polymerization temperature in the reactor, or any combination thereof, based on the catalytic activity of the activated chemically-treated solid oxide.

Aspect 12. The process defined in any one of aspects 4-11, wherein the co-catalyst is present in step (II).

Aspect 13. The process defined in any one of aspects 4-12, wherein only one transition metal compound is present in step (II).

Aspect 14. The process defined in any one of aspects 4-12, wherein two or more transition metal compounds are present in step (II).

Aspect 15. The method or process defined in any one of the preceding aspects, wherein the sample of the activated chemically-treated solid oxide is combined with the solution of the color indicator compound in any suitable vessel or container, e.g., a flask, a jar, a test tube, or a flow cell apparatus.

Aspect 16. The method or process defined in any one of the preceding aspects, wherein the color number is a summation of R+G+B.

Aspect 17. The method or process defined in any one of the preceding aspects, wherein the standard comprises a calibration curve.

Aspect 18. The method or process defined in any one of the preceding aspects, wherein the step of correlating comprises any suitable method that converts the color number into the catalytic activity of the activated chemically-treated solid oxide.

Aspect 19. An activation system comprising:
(a) an activation vessel configured to calcine a raw (or unactivated) chemically-treated solid oxide to form an activated chemically-treated solid oxide;
(b) an activator storage vessel configured to receive the activated chemically-treated solid oxide from the activation vessel and further configured to introduce the activated chemically-treated solid oxide into a catalyst preparation vessel; and
(c) an analytical system configured to determine a catalytic activity of the activated chemically-treated solid oxide prior to introducing the activated chemically-treated solid oxide into the catalyst preparation vessel.

Aspect 20. The system defined in aspect 19, wherein the analytical system comprises a color analyzer configured to measure a color of the activated chemically-treated solid oxide after contacting the activated chemically-treated solid oxide with a color indicator solution, and a computer system for generating a color number of the treated solid support and for correlating the color number to a standard to determine the catalytic activity of the activated chemically-treated solid oxide.

Aspect 21. The system defined in aspect 19 or 20, wherein the analytical system further comprises a washing system configured to clean the color analyzer after a measurement cycle.

Aspect 22. The system defined in any one aspects 19-21, wherein the activation system further comprises (d) a controller configured to control a flow rate of the activated chemically-treated solid oxide from the activator storage vessel into the catalyst preparation vessel based on, or according to, the catalytic activity determined by the analytical system.

Aspect 23. The system defined in any one of aspects 20-22, wherein the standard comprises a calibration curve.

Aspect 24. The system defined in any one of aspects 20-23, wherein the step of correlating comprises any suitable technique for converting the color number into the catalytic activity of the activated chemically-treated solid oxide.

Aspect 25. A catalyst preparation system comprising:

(a) a catalyst preparation vessel configured to contact a transition metal compound, an activated chemically-treated solid oxide, and an optional co-catalyst to form a catalyst composition;

(b) an activator feed stream configured to introduce the activated chemically-treated solid oxide into the catalyst preparation vessel;

(c) a transition metal compound feed stream configured to introduce the transition metal compound into the catalyst preparation vessel;

(d) a catalyst system feed stream configured to withdraw the catalyst composition from the catalyst preparation vessel (e.g., and to introduce the catalyst composition into a reactor, if desired); and (e) an analytical system configured to determine a catalytic activity of the activated chemically-treated solid oxide prior to introducing the activated chemically-treated solid oxide into the catalyst preparation vessel.

Aspect 26. The system defined in aspect 25, wherein the catalyst preparation system further comprises a co-catalyst feed stream configured to introduce the co-catalyst into the catalyst preparation vessel.

Aspect 27. The system defined in aspect 25 or 26, wherein the catalyst preparation system further comprises (f) a controller configured to control a flow rate of the activator feed stream and/or a flow rate of the transition metal compound feed stream (and/or a flow rate of the co-catalyst, if used) into the catalyst preparation vessel based on, or according to, the catalytic activity determined by the analytical system.

Aspect 28. The system defined in any one of aspects 25-27, wherein only one transition metal compound is present in (a).

Aspect 29. The system defined in any one of aspects 25-27, wherein two or more transition metal compounds are present in (a), and (c) includes a single feed stream for introducing a mixture of the transition metal compounds into the catalyst preparation vessel, or (c) includes separate transition metal compound feed streams for separately introducing each transition metal compound into the catalyst preparation vessel.

Aspect 30. The system defined in any one of aspects 25-29, wherein the analytical system comprises a color analyzer for measuring a color of the activated chemically-treated solid oxide after contacting the activated chemically-treated solid oxide with a color indicator solution, and a computer system for generating a color number of the treated solid support and for correlating the color number to a standard to determine the catalytic activity of the activated chemically-treated solid oxide.

Aspect 31. The system defined in any one of aspects 25-30, wherein the analytical system further comprises a washing system configured to clean the color analyzer after a measurement cycle.

Aspect 32. The system defined in aspect 30 or 31, wherein the standard comprises a calibration curve.

Aspect 33. The system defined in any one of aspects 30-32, wherein the step of correlating comprises any suitable technique for converting the color number into the catalytic activity of the activated chemically-treated solid oxide.

Aspect 34. A polymerization reactor system comprising:

(A) a reactor configured to contact a catalyst system with an olefin monomer and an optional olefin comonomer under polymerization reaction conditions to produce an olefin polymer;

(B) a catalyst preparation vessel configured to contact a transition metal compound, an activated chemically-treated solid oxide, and an optional co-catalyst to form the catalyst system; and (C) an analytical system configured to determine a catalytic activity of the activated chemically-treated solid oxide prior to introducing the activated chemically-treated solid oxide into the catalyst preparation vessel.

Aspect 35. The system defined in aspect 34, wherein the co-catalyst is present in (B).

Aspect 36. The system defined in aspect 34 or 35, wherein only one transition metal compound is present in (B).

Aspect 37. The system defined in aspect 34 or 35, wherein two or more transition metal compounds are present in (B).

Aspect 38. The system defined in any one of aspects 34-37, wherein the analytical system comprises a color analyzer for measuring a color of the activated chemically-treated solid oxide after contacting the activated chemically-treated solid oxide with a color indicator solution, and a computer system for generating a color number of the treated solid support and for correlating the color number to a standard to determine the catalytic activity of the activated chemically-treated solid oxide.

Aspect 39. The system defined in aspect 38, wherein the standard comprises a calibration curve.

Aspect 40. The system defined in aspect 38 or 39, wherein the step of correlating comprises any suitable technique for converting the color number into the catalytic activity of the activated chemically-treated solid oxide.

Aspect 41. The system defined in any one of aspects 34-40, wherein the reactor system further comprises (D) a controller configured to control a flow rate of the activated chemically-treated solid oxide into the reactor based on (or according to) the catalytic activity determined by the analytical system.

Aspect 42. The system defined in aspect 41, wherein the controller is further configured to control a flow rate of the transition metal compound into the reactor, and/or a flow rate of the co-catalyst (if used) into the reactor, an ethylene concentration in the reactor, a polymerization temperature in the reactor, or any combination thereof, based on, or according to, the catalytic activity determined by the analytical system.

Aspect 43. The process or system defined in any one of aspects 9-18 or 34-42, wherein the reactor system comprises one reactor.

Aspect 44. The process or system defined in any one of aspects 9-18 or 34-42, wherein the reactor system comprises two or more reactors.

Aspect 45. The process or system defined in any one of aspects 9-18 or 34-44, wherein the reactor system comprises a solution reactor, a gas-phase reactor, a slurry reactor, or a combination thereof. Aspect 46. The process or system defined in any one of aspects 9-18 or 34-45, wherein the reactor system comprises a loop slurry reactor.

Aspect 47. The process or system defined in any one of aspects 9-18 or 34-46, wherein the polymerization reaction conditions comprise a polymerization reaction temperature in a range from about 60° C. to about 185° C., from about 60° C. to about 115° C., or from about 130° C. to about 180° C., and any suitable reaction pressure, e.g., from about 200 to about 1000 psig.

Aspect 48. The process or system defined in any one of aspects 9-18 or 34-47, wherein the olefin monomer comprises a $C_2$-$C_{24}$ olefin.

Aspect 49. The process or system defined in any one of aspects 9-18 or 34-48, wherein the olefin monomer comprises propylene.

Aspect 50. The process or system defined in any one of aspects 9-18 or 34-48, wherein the olefin monomer comprises ethylene.

Aspect 51. The process or system defined in any one of aspects 9-18 or 34-48, wherein the catalyst system is contacted with ethylene and an olefin comonomer comprising 1-butene, 1-hexene, 1-octene, or a mixture thereof.

Aspect 52. The process or system defined in any one of aspects 9-18 or 34-48, wherein the olefin polymer comprises an ethylene homopolymer, an ethylene copolymer, a propylene homopolymer, or a propylene-based copolymer.

Aspect 53. The process or system defined in any one of aspects 9-18 or 34-48, wherein the olefin polymer comprises an ethylene/1-butene copolymer, an ethylene/1-hexene copolymer, or an ethylene/1-octene copolymer.

Aspect 54. The process or system defined in any one of aspects 4-18 or 25-53, wherein the transition metal compound (or at least one transition metal compound if two or more transition metal compounds) comprises any suitable non-metallocene compound.

Aspect 55. The process or system defined in any one of aspects 4-18 or 25-53, wherein the transition metal compound (or at least one transition metal compound if two or more transition metal compounds) comprises any suitable metallocene compound.

Aspect 56. The process or system defined in any one of aspects 4-18 or 25-53, wherein the transition metal compound (or at least one transition metal compound if two or more transition metal compounds) comprises chromium, vanadium, titanium, zirconium, hafnium, or a combination thereof.

Aspect 57. The process or system defined in any one of aspects 4-18 or 25-53, wherein two transition metal compounds are present, one of which is a bridged metallocene compound and the other is an unbridged metallocene compound.

Aspect 58. The method, process, or system defined in any one of aspects 1-57, wherein the (activated or unactivated) chemically-treated solid oxide comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, or any combination thereof.

Aspect 59. The method, process, or system defined in any one of aspects 1-57, wherein the (activated or unactivated) chemically-treated solid oxide comprises fluorided alumina, sulfated alumina, fluorided silica-alumina, sulfated silica-alumina, fluorided silica-coated alumina, fluorided-chlorided silica-coated alumina, sulfated silica-coated alumina, or any combination thereof.

Aspect 60. The method, process, or system defined in any one of aspects 1-57, wherein the (activated or unactivated) chemically-treated solid oxide comprises a fluorided solid oxide and/or a sulfated solid oxide.

Aspect 61. The method, process, or system defined in any one of aspects 1-60, wherein the color indicator compound comprises any suitable compound or any compound disclosed herein.

Aspect 62. The method, process, or system defined in any one of aspects 1-61, wherein the color indicator compound is an electron-rich compound.

Aspect 63. The method, process, or system defined in any one of aspects 1-62, wherein the color indicator compound is an unsaturated compound.

Aspect 64. The method, process, or system defined in any one of aspects 1-63, wherein the color indicator compound comprises any compound that changes the color of the activated chemically-treated solid oxide after being contacted with the activated chemically-treated solid oxide, but does not change the color of the unactivated chemically-treated solid oxide after being contacted with the unactivated chemically-treated solid oxide.

Aspect 65. The method, process, or system defined in any one of aspects 1-64, wherein the color indicator compound is colorless.

We claim:

1. A process for preparing a catalyst composition, the process comprising:
    (I) determining a catalytic activity of an activated chemically-treated solid oxide via the steps of:
        (i) combining a sample of the activated chemically-treated solid oxide with a solution of a color indicator compound to form a treated solid support;
        (ii) measuring a color of the treated solid support; and
        (iii) generating a color number of the treated solid support, and correlating the color number to a standard to determine the catalytic activity of the activated chemically-treated solid oxide;
    (II) contacting a metallocene compound, the activated chemically-treated solid oxide, and an optional co-catalyst to form the catalyst composition; and
    (III) adjusting a relative amount of at least one component of the catalyst composition based on the catalytic activity of the activated chemically-treated solid oxide.

2. The process of claim 1, wherein the activated chemically-treated solid oxide comprises a fluorided solid oxide and/or a sulfated solid oxide.

3. The process of claim 2, wherein the metallocene compound, the activated chemically-treated solid oxide, and the co-catalyst are contacted in step (II).

4. The process of claim 3, wherein the solution comprises the color indicator compound and a hydrocarbon solvent.

5. The process of claim 3, wherein the relative amount of the activated chemically-treated solid oxide is adjusted in step (III) and/or the relative amount of the metallocene compound is adjusted in step (III).

6. A process for operating a polymerization reactor system, the process comprising:

(I) determining a catalytic activity of an activated chemically-treated solid oxide via the steps of:
  (i) combining a sample of the activated chemically-treated solid oxide with a solution of a color indicator compound to form a treated solid support;
  (ii) measuring a color of the treated solid support; and
  (iii) generating a color number of the treated solid support, and correlating the color number to a standard to determine the catalytic activity of the activated chemically-treated solid oxide;
(II) contacting a catalyst system comprising a transition metal compound, the activated chemically-treated solid oxide, and an optional co-catalyst, with ethylene and an optional olefin comonomer comprising 1-butene, 1-hexene, 1-octene, or a mixture thereof, in a reactor within the polymerization reactor system under polymerization reaction conditions to produce an ethylene polymer; and
(III) adjusting a flow rate of the activated chemically-treated solid oxide into the reactor when the catalytic activity of the activated chemically-treated solid oxide has reached a predetermined level.

7. The process of claim 6, wherein:
the co-catalyst is present in the catalyst system in step (II); and
the catalyst system, ethylene, and the olefin comonomer comprising 1-butene, 1-hexene, 1-octene, or a mixture thereof, are contacted in step (II).

8. The process of claim 6, wherein the reactor comprises a solution reactor, a gas-phase reactor, a slurry reactor, or a combination thereof.

9. The process of claim 8, wherein the process further comprises controlling a flow rate of the transition metal compound into the reactor, a flow rate of the co-catalyst into the reactor, an ethylene concentration in the reactor, a polymerization temperature in the reactor, or any combination thereof, based on the catalytic activity of the activated chemically-treated solid oxide.

10. A polymerization reactor system comprising:
(A) a reactor configured to contact a catalyst system with an olefin monomer and an optional olefin comonomer under polymerization reaction conditions to produce an olefin polymer, the reactor comprising a solution reactor, a gas-phase reactor, a slurry reactor, or a combination thereof;
(B) a catalyst preparation vessel configured to contact a transition metal compound, an activated chemically-treated solid oxide, and an optional co-catalyst to form the catalyst system; and
(C) an analytical system configured to determine a catalytic activity of the activated chemically-treated solid oxide prior to introducing the activated chemically-treated solid oxide into the catalyst preparation vessel.

11. The system of claim 10, wherein the analytical system comprises a color analyzer for measuring a color of the activated chemically-treated solid oxide after contacting the activated chemically-treated solid oxide with a color indicator solution, and a computer system for generating a color number and for correlating the color number to a standard to determine the catalytic activity of the activated chemically-treated solid oxide.

12. The system of claim 11, wherein the analytical system further comprises a vessel for contacting the activated chemically-treated solid oxide with the color indicator solution.

13. The system of claim 11, wherein:
the reactor comprises a loop slurry reactor; and
the olefin polymer comprises an ethylene homopolymer, an ethylene/1-butene copolymer, an ethylene/1-hexene copolymer, and/or an ethylene/1-octene copolymer.

14. The system of claim 13, wherein the reactor system further comprises (D) a controller configured to control a flow rate of the activated chemically-treated solid oxide into the reactor based on the catalytic activity determined by the analytical system.

15. The system of claim 14, wherein the controller is further configured to control a flow rate of the transition metal compound into the reactor, a flow rate of the co-catalyst into the reactor, an ethylene concentration in the reactor, a polymerization temperature in the reactor, or any combination thereof, based on the catalytic activity determined by the analytical system.

16. An activation system comprising:
(a) an activation vessel configured to calcine an unactivated chemically-treated solid oxide to form an activated chemically-treated solid oxide;
(b) an activator storage vessel configured to receive the activated chemically-treated solid oxide from the activation vessel and further configured to introduce the activated chemically-treated solid oxide into a catalyst preparation vessel; and
(c) an analytical system configured to determine a catalytic activity of the activated chemically-treated solid oxide prior to introducing the activated chemically-treated solid oxide into the catalyst preparation vessel.

17. The system of claim 16, wherein the analytical system comprises a color analyzer configured to measure a color of the activated chemically-treated solid oxide after contacting the activated chemically-treated solid oxide with a color indicator solution, and a computer system for generating a color number and for correlating the color number to a standard to determine the catalytic activity of the activated chemically-treated solid oxide.

18. The system of claim 17, wherein the analytical system further comprises a washing system configured to clean the color analyzer after a measurement cycle.

19. The system of claim 17, wherein the activation system further comprises (d) a controller configured to control a flow rate of the activated chemically-treated solid oxide from the activator storage vessel into the catalyst preparation vessel based on the catalytic activity determined by the analytical system.

20. The system of claim 19, wherein the computer system comprises a calibration curve and/or a mathematical model.

* * * * *